United States Patent
Nakamura

(10) Patent No.: US 7,110,191 B2
(45) Date of Patent: Sep. 19, 2006

(54) IMAGING OPTICAL SYSTEM

(75) Inventor: Tohru Nakamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/072,344

(22) Filed: Mar. 7, 2005

(65) Prior Publication Data
US 2006/0028736 A1    Feb. 9, 2006

(30) Foreign Application Priority Data
Mar. 11, 2004  (JP) .............................. 2004-069185

(51) Int. Cl.
*G02B 3/02*    (2006.01)
(52) U.S. Cl. ..................... 359/720; 359/726; 359/727
(58) Field of Classification Search ............... 359/720, 359/726, 736, 753, 749, 834
See application file for complete search history.

(56) References Cited

U.S. PATENT DOCUMENTS 6,181,470 B1    1/2001  Sekita ........................ 359/364
6,327,094 B1 *  12/2001  Aoki .......................... 359/637
6,462,881 B1    10/2002  Takeyama .................... 359/630
6,646,809 B1    11/2003  Ishino et al. ................. 359/630
6,671,099 B1 *  12/2003  Nagata ........................ 359/629
6,704,052 B1 *  3/2004   Togino et al. .............. 348/340

FOREIGN PATENT DOCUMENTS

JP      2003-084200       3/2003

* cited by examiner

*Primary Examiner*—Timothy Thompson
(74) *Attorney, Agent, or Firm*—Kenyon & Kenyon LLP

(57) ABSTRACT

The invention has now found out why ghost light occurs in an imaging optical system using a decentered reflecting prism for the purpose of reducing ghost light. The invention provides an imaging optical system comprising at least one decentered prism 10 having a rotationally asymmetric reflecting surface, at least located on an image side of an aperture stop. The prism 10 comprises three or more surfaces including an entrance surface 11, a reflecting surface 12 and an exit surface 13. The reflecting surface has an effective area A+B+C, and a reflection-enhancing member is applied onto an area B+C except a sub-area A at which an effective light beam is totally reflected.

20 Claims, 14 Drawing Sheets

IMAGING OPTICAL SYSTEM

This application claims benefit of Japanese Application No. 2004-69185 filed in Japan on Mar. 11, 2004, the contents of which are incorporated by this reference.

BACKGROUND OF THE INVENTION

The present invention relates generally to an imaging optical system, and more particularly to an imaging optical system using a decentered reflecting prism.

Various imaging optical systems including decentered reflecting prisms have been proposed so far in the art. Typically, patent publication 1 has come up with an imaging optical system wherein an aperture stop is provided on both its sides with decentered reflecting prisms, each having a rotationally asymmetric reflecting surface.

On the other hand, patent publication 2 has put forward a ghost light-preventive imaging optical system using a reflecting prism, wherein the reflecting surface of the reflecting prism is provided with a film in its effective area alone, and roughened at its peripheral, non-effective area.

Patent publications 3 and 4 show an image display using a reflecting prism equipped with means for prevention of ghost light resulting from illumination light for a liquid crystal display device.

Patent Publication 1
JP(A)2003-84200
Patent Publication 2
JP(A)9-90229
Patent Publication 3
JP(A)2001-174747
Patent Publication 4
JP(A)2002-118799

In this conjunction, the imaging optical system of patent publication 1 is susceptible of ghost light that is light arriving at an image plane by way of optical paths other than a normal one. On the other hand, patent publications 2, 3 and 4 disclose how to prevent ghost light. With patent publication 2, however, prevention of ghost light is still less than satisfactory. The ghost light referred to in patent publications 3 and 4 is different from that in the case of an imaging optical system, because of stemming from an illumination optical system.

In view of such problems with the prior art as described above, the primary object of the invention is to provide an imaging optical system with reduced or substantially eliminated ghost light.

SUMMARY OF THE INVENTION

According to the first aspect of the invention, there is provided an imaging optical system comprising at least one decentered prism having a rotationally asymmetric reflecting surface, at least located on an object side of an aperture stop, characterized in that:

said decentered prism comprises three or more surfaces inclusive of an entrance surface, a reflecting surface and an exit surface, and an area of said reflecting surface except an effective area thereof where an effective light beam is totally reflected is provided with a reflection-enhancing member.

According to the second aspect of the invention, there is provided an imaging optical system comprising at least one decentered prism having a rotationally asymmetric reflecting surface, at least located on an object side of an aperture stop, characterized in that:

said decentered prism comprises three surfaces consisting of an entrance surface, a reflecting surface and an exit surface, wherein a light ray incident from said exit surface and passing through said decentered prism toward said entrance surface in a direction opposite to a direction of a light ray from an object is kept from reaching said area of said reflecting surface provided with a reflection-enhancing member, after total reflection at said entrance surface.

According to the third aspect of the invention, there is provided an imaging optical system comprising at least one decentered prism having a rotationally asymmetric reflecting surface, at least located on an object side of an aperture stop, characterized in that:

said decentered prism comprises three or more surfaces inclusive of an entrance surface, a reflecting surface and an exit surface, and has a non-optical surface that faces said entrance surface and takes no part in image formation, wherein said non-optical surface is provided with shading lines comprising a number of grooves in a direction that crosses a meridional section through said decentered prism.

According to the fourth aspect of the invention, there is provided an imaging optical system comprising at least one decentered prism having a rotationally asymmetric reflecting surface, at least located on an object side of an aperture stop, characterized in that:

an end face of an aperture in said aperture stop is formed such that a portion comprising conical facets (including cylindrical surfaces) having a half vertex angle of up to 10° with a center axis defined by an center axis of the aperture has a thickness of up to 0.05 mm.

According to the fifth aspect of the invention, there is provided an imaging optical system comprising at least one decentered prism having a rotationally asymmetric reflecting surface, at least located on an object side of an aperture stop, characterized by satisfying $$Z_s > 0.5$$

where $Z_s$ is a position of a stop plane defined by connecting points of minimum radius of an aperture end of said aperture stop, provided that an object-side surface of a stop plate that forms said aperture stop is Z=0 and an image-side surface thereof is Z=1.

According to the sixth aspect of the invention, there is provided an imaging optical system comprising at least one decentered prism having a rotationally asymmetric reflecting surface, at least located on an object side of an aperture stop, characterized in that:

said decentered prism comprises three or more surfaces inclusive of an entrance surface, a reflecting surface and an exit surface, and on an object side of the entrance surface of said decentered prism there is provided a hood that shades off light from outside an effective light beam, wherein an end of said hood as measured parallel with an entrance-side optical axis is located substantially at the same position as a position of the effective light beam nearest to an object side in said imaging optical system.

According to the seventh aspect of the invention, there is provided an imaging optical system comprising an aperture stop, at least one decentered prism having a rotationally asymmetric reflecting surface and located on an object side of said aperture stop, and at least one decentered prism having a rotationally asymmetric reflecting surface and located on an image side of said aperture stop, characterized in that:

a step or a groove is provided outside an effective area of an entrance surface of said decentered prism that is located on the image side of said aperture stop.

According to the eighth aspect of the invention, there is provided an imaging optical system comprising an aperture stop, at least one decentered prism having a rotationally asymmetric reflecting surface and located on an object side of said aperture stop, and at least one decentered prism having a rotationally asymmetric reflecting surface and located on an image side of said aperture stop, characterized in that:

an effective area plus a peripheral area of the reflecting surface of at least the decentered prism located on the image side are provided with a reflection-enhancing member with a margin of between 0.05 mm and 0.1 mm.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 7(a), 7(b) and 7(c) are illustrative of influences on ghosts in the case where (a) the aperture end face is substantially vertical, (b) the aperture end face is inclined wide open toward the object side, and (c) the aperture end face is arched in section.

FIG. 8 is generally illustrative of actual sectional shapes in the case where the aperture end face of the stop is inclined wide open toward the object side. More specifically.

FIG. 9 is generally illustrative of the hood located in place without increasing the whole size of the imaging optical system. More specifically.

FIG. 14 is generally illustrative of the range of the reflection-enhancing member applied onto the reflecting surface of the decentered prism. More specifically.

DESCRIPTION OF THE PREFERRED EMBODIMENTS

First of all, Numerical Example 1 of the imaging optical system according to the invention will be explained. Then, the ghost light-preventive means will be explained with reference to the optical system in that numerical example.

Figure 1:
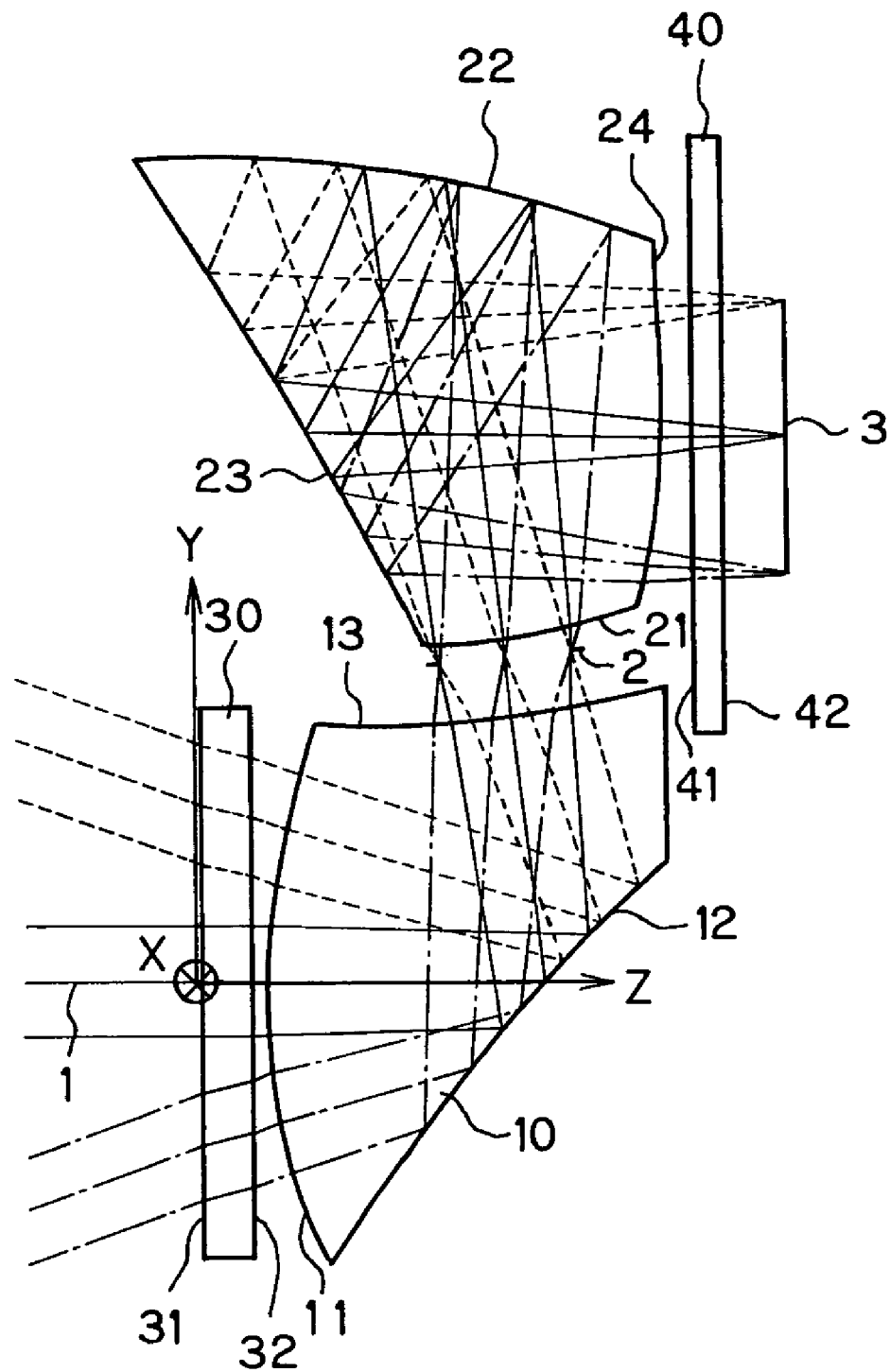
FIG. 1 is an optical path diagram for one meridional section in Numerical Example 1 of the imaging optical system according to the invention.

FIG. 1 is an optical path diagram for one meridional section through the instant example. It is here noted that the imaging optical system of the invention is constructed of a front group, a stop and a rear group in order of propagation of light from its object side. In the front group in front of a stop 2, there are located a cover glass 30 comprising parallel front and rear surfaces 31 and 32 and a first prism 10, and in the rear group in the rear of the stop 2 there are located a second prism 20 and a cover glass 40 comprising parallel front and rear surfaces 41 and 42. An image pickup device (image plane) 3 is positioned just after the cover glass 40. In this example, an axial chief ray 1 incident on the image pickup device 3 and an axial chief ray 1 through an object space are parallel in the same direction.

The first prism 10 is made up of a first surface 11, a second surface 12 and a third surface 13 which provide an entrance surface, a reflecting surface and an exit surface, respectively. A light ray from an object passes through the entrance surface 11, and leaves the exit surface 13 after internally reflected at the reflecting surface 12. The second prism 20 is built up of a first surface 21, a second surface 22, a third surface 23 and a fourth surface 24 which provide an entrance surface, a first reflecting surface, a second reflecting surface and an exit surface, respectively. Coming from the first prism 10 and passing through the stop 2, a light ray passes through the entrance surface 21, and is internally reflected at the first reflecting surface 22 and then at the second reflecting surface 23, leaving the exit surface 24. The transmitted light forms an image on the image pickup plane of the image pickup device 3.

In the instant imaging optical system, the stop 2 functions as an aperture stop. It is here noted that the imaging optical system does not form any intermediate image. The first and second surfaces 21 and 22 of the second prism 20 oppose to each other with a prism medium sandwiched between them, and the third and fourth surfaces 23 and 24 oppose to each other with a prism medium sandwiched between them. Therefore, an optical path of connecting the first and second surfaces 21 and 22 together crosses an optical path of connecting the third and fourth surfaces 23 and 24 together in the prism. It is understood that the first to third surfaces 11 to 13 of the first prism 10 and the first to fourth surfaces 21 to 24 of the second prism 20 are all made up of free-form surfaces with only one plane of symmetry defined by the plane of FIG. 1 (Y-Z plane). Thus, the whole optical system, too, is plane symmetric with respect to the meridional section of FIG. 1.

Surface numbers are given in the form of normal ray tracing from the object toward the image pickup plane of the image pickup device 3 via the front group, the stop 2 and the rear group of the optical system, although the constituting parameters in Example 1 will be enumerated later. Referring here to take coordinates, the axial chief ray 1 is defined by a light ray passing from the center of the stop 2 to the center of the image pickup device 3, as shown in FIG. 1. The Z-axis is defined by the axial chief ray on the object side of the first surface 31 of the cover glass 30, the direction of the Y-axis is defined by a direction that is orthogonal to the Z-axis and lies in the meriodinal section, and the direction of the X-axis is defined by a direction that is orthogonal to the Z-axis and the direction of the Y-axis. Then, the origin of the coordinates is defined by a point of intersection of the surface 31 of the cover glass 30 with the Z-axis. Finally, the positive direction of the Z-axis, the positive direction of the Y-axis and the positive direction of the X-axis are defined by a direction from the cover glass 30 toward the first prism 10, a direction of the Y-axis toward the image pickup device 3 and a direction of the X-axis that forms a right-handed system with the Y-axis and Z-axis. This coordinate system is now called the global coordinate system.

Apart from this, there is provided a coordinate system (local coordinate system) for defining the shape for each surface, with the origin placed on the vertex of each surface and the Y-Z plane set in meridional section.

The free-form surface used herein is defined by the following equation (a) with respect to the local coordinate system. It is noted that the axis of the free-form surface is given by the Z-axis of this defining equation.

$$Z = cr^2 / \left[1 + \sqrt{\{1-(1+k)c^2r^2\}}\right] + \sum_{j=2}^{66} C_j X^m Y^n \quad (a)$$

In equation (a), the first term is a secondary surface term and the second term is a free-form surface term.

In the secondary surface term, c is a curvature of vertex, k is a conic (conical) constant, and $r=\sqrt{(X^2+Y^2)}$ The free-form surface term could be expanded as in the following (b).

$$\sum_{j=2}^{\infty} C_j X^m Y^n = \quad (b)$$

$$C_2 X + C_3 Y + C_4 X^2 + C_5 XY + C_6 Y^2 + C_7 X_3 + C_8 X^2 Y + C_9 XY^2 +$$

$$C_{10} Y^3 + C_{11} X^4 + C_{12} X^3 Y + C_{13} X^2 Y^2 + C_{14} XY^3 + C_{15} Y^4 +$$

$$C_{16} X^5 + C_{17} X^4 Y + C_{18} X^3 Y^2 + C_{19} X^2 Y^3 + C_{20} XY^4 + C_{21} Y^5 +$$

$$C_{22} X^6 + C_{23} X^5 Y + C_{24} X^4 Y^2 + C_{25} X^3 Y^3 + C_{26} X^2 Y^4 +$$

$$C_{27} XY^5 + C_{28} Y^6 + C_{29} X^7 + C_{30} X^6 Y + C_{31} X^5 Y^2 +$$

-continued
$$C_{32} X^4 Y^3 + C_{33} X^3 Y^4 + C_{34} X^2 Y^5 + C_{35} XY^6 + C_{36} Y^7$$

where $C_j$ (j is an integer of 2 or greater) is a coefficient.

In general, the aforesaid free-form surface has no symmetric surface at both the X-Z plane and the Y-Z plane. However, by reducing all the odd-numbered terms for X, i.e., $C_2$, $C_5$, $C_7$, $C_9$, $C_{12}$, $C_{14}$, $C_{16}$, $C_{18}$, $C_{20}$, $C_{23}$, $C_{25}$, $C_{29}$, $C_{31}$, $C_{33}$, $C_{35}$ . . . down to zero, that free-form surface can have only one symmetric surface parallel with the Y-Z plane.

For the decentrated surface, the amount of decentration of the vertex position of that surface from the origin of the associated coordinate system (X, Y and Z in the X-, Y- and Z-axis directions, respectively) and the center axis of that surface (for the free-form surface, the angle of tilt around the Z-axis of the aforesaid formula (a) ($\alpha$, $\beta$, $\gamma$(°)) are given. In that case, positive $\alpha$ and $\beta$ mean counterclockwise rotation with respect to the positive direction of the respective axes, and positive $\gamma$ means clockwise rotation with respect to the positive direction of the Z-axis. Referring here to how to effect $\alpha$, $\beta$ and $\gamma$ rotation of the center axis of a surface, the center axis of the surface and its XYZ orthogonal coordinate system are first $\alpha$ rotated counterclockwise around the X-axis and then, the center axis of the rotated surface is $\beta$ rotated counterclockwise around the Y-axis of a near coordinate system while the once rotated coordinate system is $\beta$ rotated counterclock-wise around the Y-axis. Finally, the center axis of the twice rotated is $\gamma$ rotated clockwise around the Z-axis of a new coordinate system for the new coordinate system.

When, of optical surfaces that forms the optical system in each example, a specific surface and the subsequent surface form together a coaxial optical system, a surface spacing is given and the refractive index, Abbe's number or the like of medium are given as usual.

Among other free-form surface defining formulae, there is Zernike polynomial given by the following formula (b). The shape of this surface is defined by the following formula. The axis for Zernike polynomial is given by the Z-axis of the defining formula (b). The rotationally asymmetric surface is defined by polar coordinates for the height of the Z-axis with respect to the X-Y plane provided that R is the distance from the Z-axis within the X-Y plane and A is the azimuth angle around the Z axis, as expressed by the angle of rotation measured from the X-axis.

$$x = R \times \cos(A) \, y = R \times \sin(A) \, z = \quad (c)$$

$$D_2 + D_3 R \cos(A) + D_4 R \sin(A) + D_5 R^2 \cos(2A) + D_6(R^2 - 1) +$$

$$D_7 R^2 \sin(2A) + D_8 R^3 \cos(3A) + D_9(3R^3 - 2R) \cos(A) +$$

$$D_{10}(3R^3 - 2R) \sin(A) + D_{11} R^3 \sin(3A) + D_{12} R^4 \cos(4A) +$$

$$D_{13}(4R^4 - 3R^2) \cos(2A) + D_{14}(6R^4 - 6R^2 + 1) +$$

$$D_{15}(4R^4 - 3R^2) \sin(2A) + D_{16} R^4 \sin(4A) + D_{17} R^5 \cos(5A) +$$

$$D_{18}(5R^5 - 4R^3) \cos(3A) + D_{19}(10R^5 - 12R^3 + 3R) \cos(A) +$$

$$D_{20}(10R^5 - 12R^3 + 3R) \sin(A) + D_{21}(5R^5 - 4R^3) \sin(3A) +$$

$$D_{22} R^5 \sin(5A) + D_{23} R^6 \cos(6A) + D_{24}(6R^6 - 5R^4) \cos(4A) +$$

$$D_{25}(15R^6 - 20R^4 + 6R^2) \cos(2A) +$$

$$D_{26}(20R^6 - 30R^4 + 12R^2 - 1) +$$

-continued $$D_{27}(15R^6 - 20R^4 + 6R^2)\sin(2A) +$$
$$D_{28}(6R^6 - 5R^4)\sin(4A) + D_{29}R^6\sin(6A) + \ldots$$

Here $D_m$ (m is an integer of 2 or greater) is a coefficient.

Numerical data in Numerical Example 1 are given just below, with "FFS" and "RE" standing for a free-form surface and a reflecting surface, respectively.

NUMERICAL EXAMPLE 1

Size of entrance pupil system: Φ1.3 mm,
Image plane size: 3.6 mm in width, and 2.7 mm in height,
Half angle of view: 20.06° in the X-direction, and 20.15° in the Y direction,
Focal length: 2.68 mm, and
F-number: 2.8.

| Surface No. | Radius of curvature | Surface Displacement separation and tilt | Refractive index | Abbe's No. |
|---|---|---|---|---|
| Object plane | ∞ | ∞ | | |
| 1 | ∞ | (1) | 1.4950 | 65.0 |
| 2 | ∞ | (2) | | |
| 3 | F F S [1] | (3) | 1.6069 | 27.0 |
| 4 | F F S [2] (RE) | (4) | 1.6069 | 27.0 |
| 5 | F F S [3] | (5) | | |
| 6 | ∞ (Stop) | (6) | | |
| 7 | F F S [4] | (7) | 1.5256 | 56.4 |
| 8 | F F S [5] (RE) | (8) | 1.5256 | 56.4 |
| 9 | F F S [6] (RE) | (9) | 1.5256 | 56.4 |
| 10 | F F S [7] | (10) | | |
| 11 | ∞ | (11) | 1.5163 | 64.1 |
| 12 | ∞ | (12) | | |
| Image plane | ∞ | (13) | | |

FFS [1]

| | | | | | |
|---|---|---|---|---|---|
| $C_4$ | $4.1709 \times 10^{-2}$ | $C_6$ | $6.5908 \times 10^{-2}$ | $C_8$ | $-1.0688 \times 10^{-4}$ |
| $C_{10}$ | $-1.1246 \times 10^{-3}$ | $C_{11}$ | $6.6599 \times 10^{-4}$ | $C_{13}$ | $1.6298 \times 10^{-3}$ |
| $C_{15}$ | $7.4708 \times 10^{-4}$ | $C_{17}$ | $-2.9507 \times 10^{-5}$ | $C_{19}$ | $9.7169 \times 10^{-5}$ |
| $C_{21}$ | $-1.7566 \times 10^{-4}$ | $C_{22}$ | $-2.5840 \times 10^{-6}$ | $C_{24}$ | $5.7315 \times 10^{-5}$ |
| $C_{26}$ | $-3.4271 \times 10^{-5}$ | $C_{28}$ | $3.0860 \times 10^{-5}$ | | |

FFS [2]

| | | | | | |
|---|---|---|---|---|---|
| $C_4$ | $-3.9587 \times 10^{-3}$ | $C_6$ | $2.7654 \times 10^{-2}$ | $C_8$ | $-1.0723 \times 10^{-3}$ |
| $C_{10}$ | $1.9555 \times 10^{-3}$ | $C_{11}$ | $7.7516 \times 10^{-5}$ | $C_{13}$ | $-1.7029 \times 10^{-4}$ |
| $C_{15}$ | $3.4007 \times 10^{-4}$ | $C_{17}$ | $-3.4680 \times 10^{-5}$ | $C_{19}$ | $1.0476 \times 10^{-4}$ |
| $C_{21}$ | $4.8180 \times 10^{-6}$ | $C_{22}$ | $-6.2801 \times 10^{-5}$ | $C_{24}$ | $-4.7571 \times 10^{-7}$ |
| $C_{26}$ | $1.6082 \times 10^{-5}$ | $C_{28}$ | $-8.1118 \times 10^{-6}$ | | |

FFS [3]

| | | | | | |
|---|---|---|---|---|---|
| $C_3$ | $-3.3425 \times 10^{-2}$ | $C_4$ | $-7.8403 \times 10^{-2}$ | $C_6$ | $-4.0695 \times 10^{-2}$ |
| $C_8$ | $-8.8984 \times 10^{-3}$ | $C_{10}$ | $6.2496 \times 10^{-3}$ | $C_{11}$ | $-1.5720 \times 10^{-3}$ |
| $C_{13}$ | $-2.7166 \times 10^{-2}$ | $C_{15}$ | $1.4357 \times 10^{-3}$ | $C_{17}$ | $-6.5515 \times 10^{-4}$ |
| $C_{19}$ | $3.6911 \times 10^{-4}$ | $C_{21}$ | $-2.1928 \times 10^{-4}$ | $C_{22}$ | $1.8341 \times 10^{-3}$ |
| $C_{24}$ | $-3.0393 \times 10^{-3}$ | $C_{26}$ | $2.0951 \times 10^{-3}$ | $C_{28}$ | $-6.7649 \times 10^{-4}$ |

FFS [4]

| | | | | | |
|---|---|---|---|---|---|
| $C_3$ | $-2.8391 \times 10^{-2}$ | $C_4$ | $1.2123 \times 10^{-1}$ | $C_6$ | $-8.3113 \times 10^{-2}$ |
| $C_8$ | $7.8309 \times 10^{-3}$ | $C_{10}$ | $2.1910 \times 10^{-3}$ | $C_{11}$ | $6.5905 \times 10^{-3}$ |
| $C_{13}$ | $-1.7892 \times 10^{-2}$ | $C_{15}$ | $1.5127 \times 10^{-3}$ | $C_{17}$ | $-6.7547 \times 10^{-4}$ |
| $C_{19}$ | $4.3224 \times 10^{-4}$ | $C_{21}$ | $-8.3463 \times 10^{-5}$ | $C_{22}$ | $-2.3991 \times 10^{-4}$ |
| $C_{24}$ | $-8.1334 \times 10^{-3}$ | $C_{26}$ | $7.9144 \times 10^{-4}$ | $C_{28}$ | $-4.9662 \times 10^{-4}$ |

FFS [5]

| | | | | | |
|---|---|---|---|---|---|
| $C_4$ | $3.8550 \times 10^{-2}$ | $C_6$ | $4.1924 \times 10^{-2}$ | $C_8$ | $1.7538 \times 10^{-3}$ |
| $C_{10}$ | $-3.9045 \times 10^{-4}$ | $C_{11}$ | $8.7475 \times 10^{-5}$ | $C_{13}$ | $6.4778 \times 10^{-4}$ |
| $C_{15}$ | $1.7386 \times 10^{-4}$ | $C_{17}$ | $-1.0376 \times 10^{-5}$ | $C_{19}$ | $-1.6202 \times 10^{-6}$ |

| Surface No. | Radius of curvature | | Surface Displacement separation and tilt | | Refractive index | Abbe's No. |
|---|---|---|---|---|---|---|
| $C_{21}$ | $-1.7314 \times 10^{-5}$ | $C_{22}$ | $-2.3351 \times 10^{-7}$ | $C_{24}$ | $1.1257 \times 10^{-5}$ | |
| $C_{26}$ | $-9.6773 \times 10^{-6}$ | $C_{28}$ | $-9.8518 \times 10^{-6}$ | | | |

FFS [6]

| | | | | | | |
|---|---|---|---|---|---|---|
| $C_4$ | $-2.4098 \times 10^{-2}$ | $C_6$ | $1.1095 \times 10^{-2}$ | $C_8$ | $2.5243 \times 10^{-4}$ | |
| $C_{10}$ | $8.0683 \times 10^{-5}$ | $C_{11}$ | $-1.0086 \times 10^{-4}$ | $C_{13}$ | $8.3763 \times 10^{-4}$ | |
| $C_{15}$ | $3.5919 \times 10^{-4}$ | $C_{17}$ | $-6.6515 \times 10^{-5}$ | $C_{19}$ | $5.2149 \times 10^{-5}$ | |
| $C_{21}$ | $6.6212 \times 10^{-5}$ | $C_{22}$ | $4.1040 \times 10^{-7}$ | $C_{24}$ | $4.0895 \times 10^{-6}$ | |
| $C_{26}$ | $-6.4842 \times 10^{-6}$ | $C_{28}$ | $-9.8152 \times 10^{-6}$ | | | |

FFS [7]

| | | | | | | |
|---|---|---|---|---|---|---|
| $C_3$ | $4.8640 \times 10^{-2}$ | $C_4$ | $3.7051 \times 10^{-2}$ | $C_6$ | $6.3083 \times 10^{-2}$ | |
| $C_8$ | $1.4429 \times 10^{-3}$ | $C_{10}$ | $2.1610 \times 10^{-4}$ | $C_{11}$ | $-8.4235 \times 10^{-3}$ | |
| $C_{13}$ | $-8.8574 \times 10^{-3}$ | $C_{15}$ | $-4.6112 \times 10^{-3}$ | $C_{17}$ | $-4.4861 \times 10^{-4}$ | |
| $C_{19}$ | $5.3081 \times 10^{-4}$ | $C_{21}$ | $1.1103 \times 10^{-3}$ | $C_{22}$ | $4.3529 \times 10^{-4}$ | |
| $C_{24}$ | $5.0879 \times 10^{-4}$ | $C_{26}$ | $1.0880 \times 10^{-3}$ | $C_{28}$ | $-1.2467 \times 10^{-4}$ | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | −0.00 | Z | 0.64 |
|---|---|---|---|---|---|
| α | −0.95 | β | 0.00 | γ | 0.00 |

Displacement and tilt(4)

| X | 0.00 | Y | −0.02 | Z | 3.34 |
|---|---|---|---|---|---|
| α | −41.75 | β | 0.00 | γ | 0.00 |

Displacement and tilt(5)

| X | 0.00 | Y | 2.63 | Z | 3.02 |
|---|---|---|---|---|---|
| α | −83.86 | β | 0.00 | γ | 0.00 |

Displacement and tilt(6)

| X | 0.00 | Y | 3.21 | Z | 2.96 |
|---|---|---|---|---|---|
| α | −83.86 | β | 0.00 | γ | 0.00 |

Displacement and tilt(7)

| X | 0.00 | Y | 3.39 | Z | 2.94 |
|---|---|---|---|---|---|
| α | −83.86 | β | 0.00 | γ | 0.00 |

Displacement and tilt(8)

| X | 0.00 | Y | 7.89 | Z | 2.41 |
|---|---|---|---|---|---|
| α | −101.29 | β | 0.00 | γ | 0.00 |

Displacement and tilt(9)

| X | 0.00 | Y | 5.44 | Z | 1.03 |
|---|---|---|---|---|---|
| α | −150.09 | β | 0.00 | γ | 0.00 |

Displacement and tilt(10)

| X | 0.00 | Y | 5.38 | Z | 4.48 |
|---|---|---|---|---|---|
| α | −180.00 | β | 0.00 | γ | 0.00 |

Displacement and tilt(11)

| X | 0.00 | Y | 5.38 | Z | 4.79 |
|---|---|---|---|---|---|
| α | 0.00 | β | 0.00 | γ | 0.00 |

Displacement and tilt(12)

| X | 0.00 | Y | 5.38 | Z | 5.09 |
|---|---|---|---|---|---|
| α | 0.00 | β | 0.00 | γ | 0.00 |

Displacement and tilt(13)

| X | 0.00 | Y | 5.38 | Z | 5.72 |
|---|---|---|---|---|---|
| α | 0.00 | β | 0.00 | γ | 0.00 |

Figure 2:
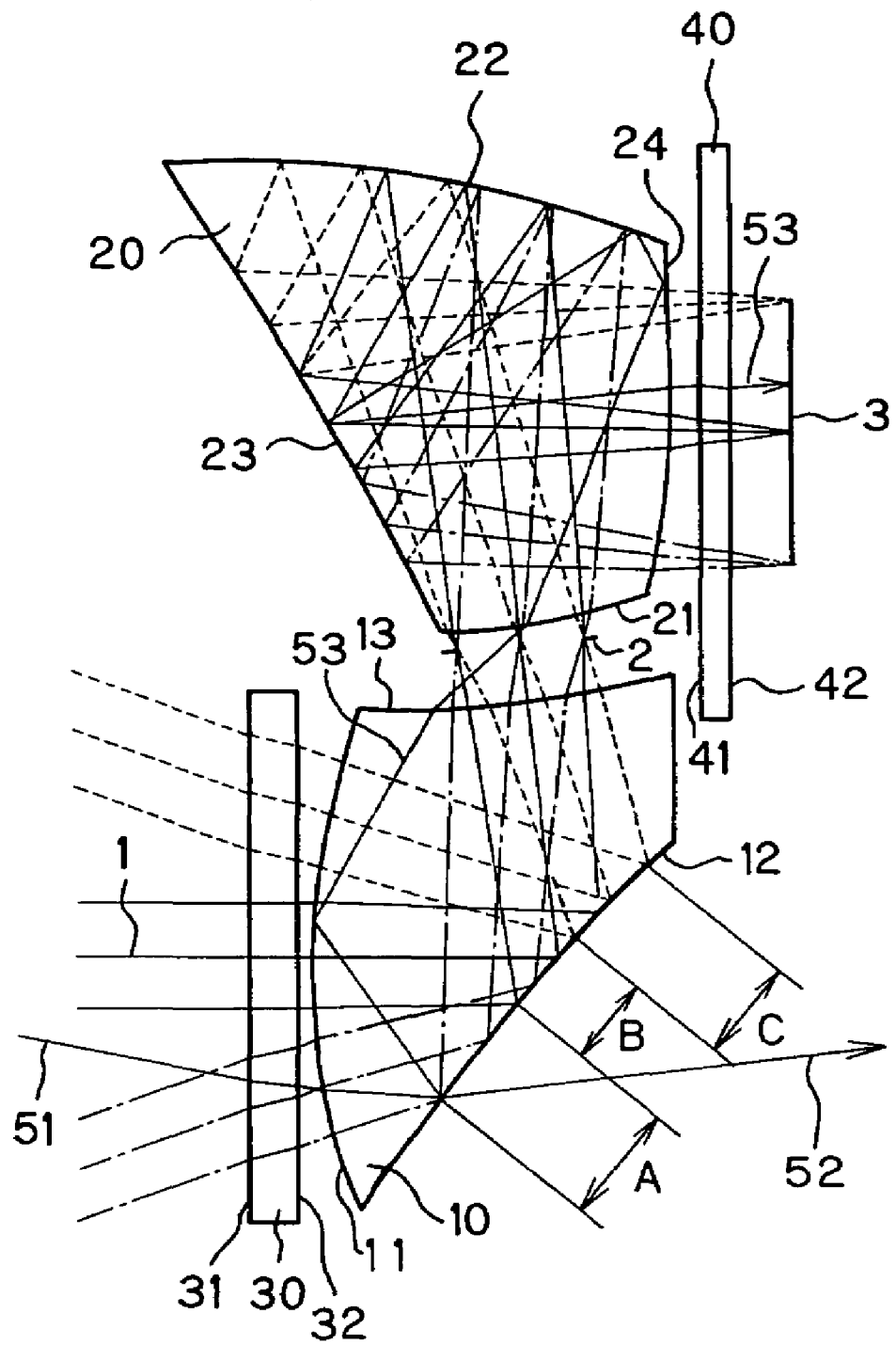
FIG. 2 is illustrative of one ghost light-preventive means according to the invention, and is an optical path diagram similar to FIG. 1.

The ghost light-preventive means is now explained with reference to the imaging optical system set up as described in the above example. FIG. 2 is an optical path diagram similar to FIG. 1. A light beam from an object is incident on an entrance pupil. This entrance pupil is an image of the stop 2 by the first prism 10. The light beam from the object enters the first prism 10 from its first surface 11 via the cover glass 30. The incident light beam is reflected at the second surface 12, leaving the first prism 10 via the third surface 13. The light beam enters the second prism 20 via the stop 2 to form an image on the image pickup plane of the image pickup device 3 via the cover glass 40. In this case, light reflected at an area A+B+C (FIG. 2) of the second surface 12 of the first prism 10 behaves as normal light to form an image on the image pickup device 3. Of the area A+B+C of the second surface 12, the sub-area A provides a range wherein the light beam incident at angles greater than the critical angle is totally reflected at every angle of view. The sub-area B provides a range wherein the light beam is or is not totally reflected depending on the angle of view, and the sub-area C provides a range wherein the light beam incident at angles smaller than the critical angle are not totally reflected at every angle of view.

Generally in such a case, the reflection-enhancing member such as a metal film is applied to the area A+B+C, i.e., all over the effective area of the second surface 12.

With the application of such a reflection-enhancing member onto, for instance, the above sub-area A, however, the following inconvenience occurs. Here consider a light ray deviating from the normal direction of a light beam going toward the entrance pupil, for instance, a light ray 51 in FIG. 2. Upon incidence on the first prism 10 via the cover glass 30 and the first surface 11, this light ray 51 strikes on the sub-area A in the effective area of the second surface 12, at which it is reflected into a light ray 53. Then, that light ray 53 is incident on the first surface 11 at an angle of incidence greater than the critical angle, at which it is totally reflected. Subsequently, the reflected light 35 leaves the first prism 10 through the third surface 13, entering the second prism 20 from its first surface 21 through the stop 2. Then, the light ray 53 is totally reflected at the fourth surface 24, and reflected first at the second surface 22 and then the third surface 23, as shown in FIG. 2. Finally, the light ray 53 leaves the second prism 20 through the fourth surface 24, striking on the image pickup plane of the image pickup device 3 through the cover glass 40. Thus, the light ray 53 (51) strikes on the image pickup device 3, forming a ghost image.

In the instant example, the reflection-enhancing member such as a metal film is thus applied onto the area B+C alone rather than all over the effective area of the second surface 12, so that the incident light ray 51 can transmit through the second surface 12, leaving the optical system in the form of transmitted light 52. This ensures that ghost light 53 can be substantially reduced. As a matter of course, it is understood that the reflection-enhancing member such as a metal film is not applied onto the sub-area A where all normal light is totally reflected.

Alternatively, the imaging optical system could be constructed such that as a light ray is entered in the first prism from the third surface 13 in meridional section, the light ray going toward the first surface 11 stops short of the area of the second surface 12 provided with the reflection-enhancing member after total reflection at the first surface 11. This ensures to eliminate ghost light like the light ray 53 in FIG. 2.

More preferably, the imaging optical system should be constructed such that as a light ray is entered in the effective area of the third surface 13, it stops short of the area of the second surface 12 provided with the reflection-enhancing member after total reflection at the first surface 11. This makes it possible to eliminate ghost light like the light ray 53 in FIG. 2.

Figure 3:
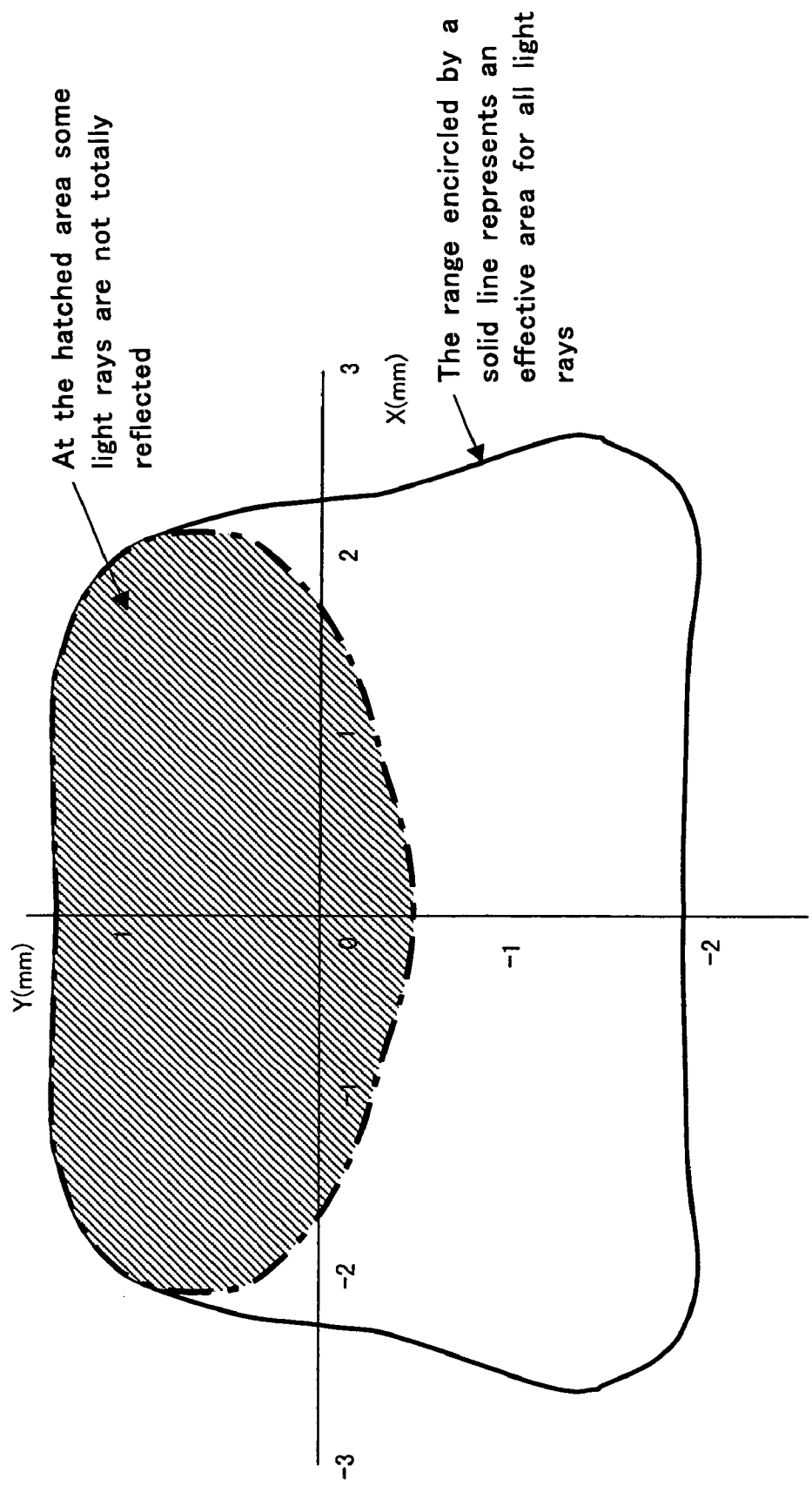
FIG. 3 is illustrative of an effective area and an area provided with a reflection-enhancing member of the second surface of the first prism in Numerical Example 1.

FIG. 3 is specifically illustrative of the effective area of the second surface 12 of the first prism 10 (Surface No. 4 in Numerical Example 1) and the area of the second surface 12 to be provided with the reflection-enhancing member. FIG. 3 is a view obtained by projection of the effective area of the second surface 12 onto the X-Y plane of the local coordinates (the tangent plane at the vertex). An area of substantially trapezoidal shape encircled by a solid line in FIG. 3 is indicative of a range of all effective light rays arriving at that surface 12, i.e., an effective area (the area A+B+C). A hatched area encircled by a one-dotted line is indicative of an area to receive light rays that are included in the effective light rays but not totally reflected (the area B+C). An area except the hatched area encircled by the one-dotted line is indicative of an area where all light rays are totally reflected (the sub-area A). In the instant example, the reflection-enhancing member is thus applied onto only the hatched area encircled by the one-dotted line. It is understood that the local coordinate system is also to define the shape of the second surface 12.

Coordinate values of border lines in these areas are given below as data expressed in terms of the local coordinate system (only data on the left half of $X \leq 0$ are given because of symmetry with respect to the Y-axis).

Total Light Rays Light Rays not subjected to total Reflection

| X | Y | X | Y |
| --- | --- | --- | --- |
| 0.000 | 1.330 | 0.000 | 1.330 |
| −1.119 | 1.360 | −1.119 | 1.360 |
| −1.420 | 1.328 | −1.420 | 1.328 |
| −1.707 | 1.222 | −1.707 | 1.222 |
| −1.937 | 1.060 | −1.937 | 1.060 |
| −2.070 | 0.866 | −2.070 | 0.866 |
| −2.278 | 0.019 | −1.990 | 0.310 |
| −2.584 | −1.159 | −1.650 | −0.050 |
| −2.607 | −1.462 | −1.350 | −0.190 |
| −2.496 | −1.719 | −1.050 | −0.290 |
| −2.271 | −1.890 | −0.770 | −0.350 |
| −1.967 | −1.943 | −0.600 | −0.400 |
| −0.947 | −1.897 | −0.390 | −0.440 |
| 0.000 | −1.884 | 0.000 | −0.470 |

It is noted that the reflection-enhancing member used herein, for instance, include a reflection film such a dielectric multilayer film or a reflection film such as a metal film.

Figure 4:
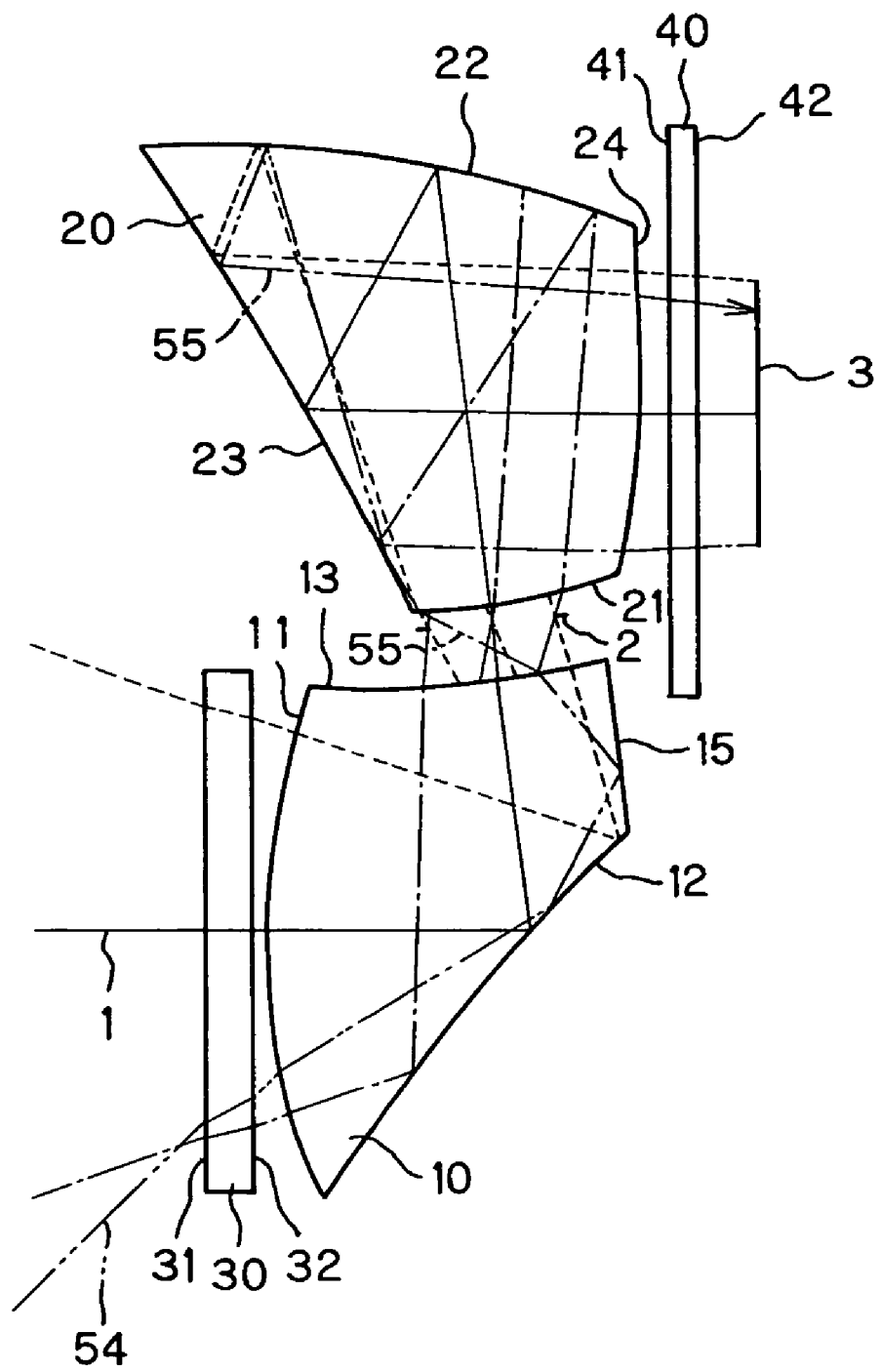
FIG. 4 is illustrative of another ghost light preventive means according to the invention, and an optical path diagram similar to FIG. 1.

Another ghost light-preventive means is now explained with reference to FIG. 4 that is an optical path diagram similar to FIG. 1. A light beam from an object goes toward an entrance pupil that is an image of the stop 2 by the first prism 10. The light beam from the object passes through the cover glass 30, and enters the first prism 10 from its first surface 11. The incident light is reflected at the second surface 12, leaving the first prism 10 through its third surface 13. Then, the light beam passes through the stop 2 and enters the second prism 20 to form an image on the image pickup plane of the image pickup device 3 via the cover glass 40.

In the instant example, the first prism 10 is made up of optical surfaces 11, 12 and 13 taking part in refraction and reflection, and further includes a surface left behind after removal of unnecessary portions thereof, i.e., a non-optical surface 15 that faces the first surface 11, although not explained in conjunction with FIG. 1. For this reason, a light ray deviating from the normal direction of the light beam going toward the entrance pupil, for instance, a light ray (indicated by a two-dotted line) 54 in FIG. 4, behaves as follows. The light ray 54 passes through the cover glass 30, and enters the first prism 10 through its first surface 11. Then, the light ray 54 is reflected at an effective area of, for instance, the second surface 12. The reflected light 54 is incident on the non-optical surface 15, at which it is totally reflected into reflected light 55. That reflected light 55 leaves the first prism 10 through its third surface 13, and passes through the stop 2, after which the reflected light 55 enters the second prism 20 from its first surface 21. Then, the reflected light 55 is totally reflected at the third surface 23, and reflected first at the second surface 22 and then at the third surface 23, leaving the second prism 20 from its fourth surface 24. Finally, the reflected light 55 passes through the cover glass 40, striking on the image pickup plane of the image pickup device 3. In this way, the light ray 54 (reflected light 55) is eventually incident on the image pickup device 3 only to form a ghost image.

Figure 5:
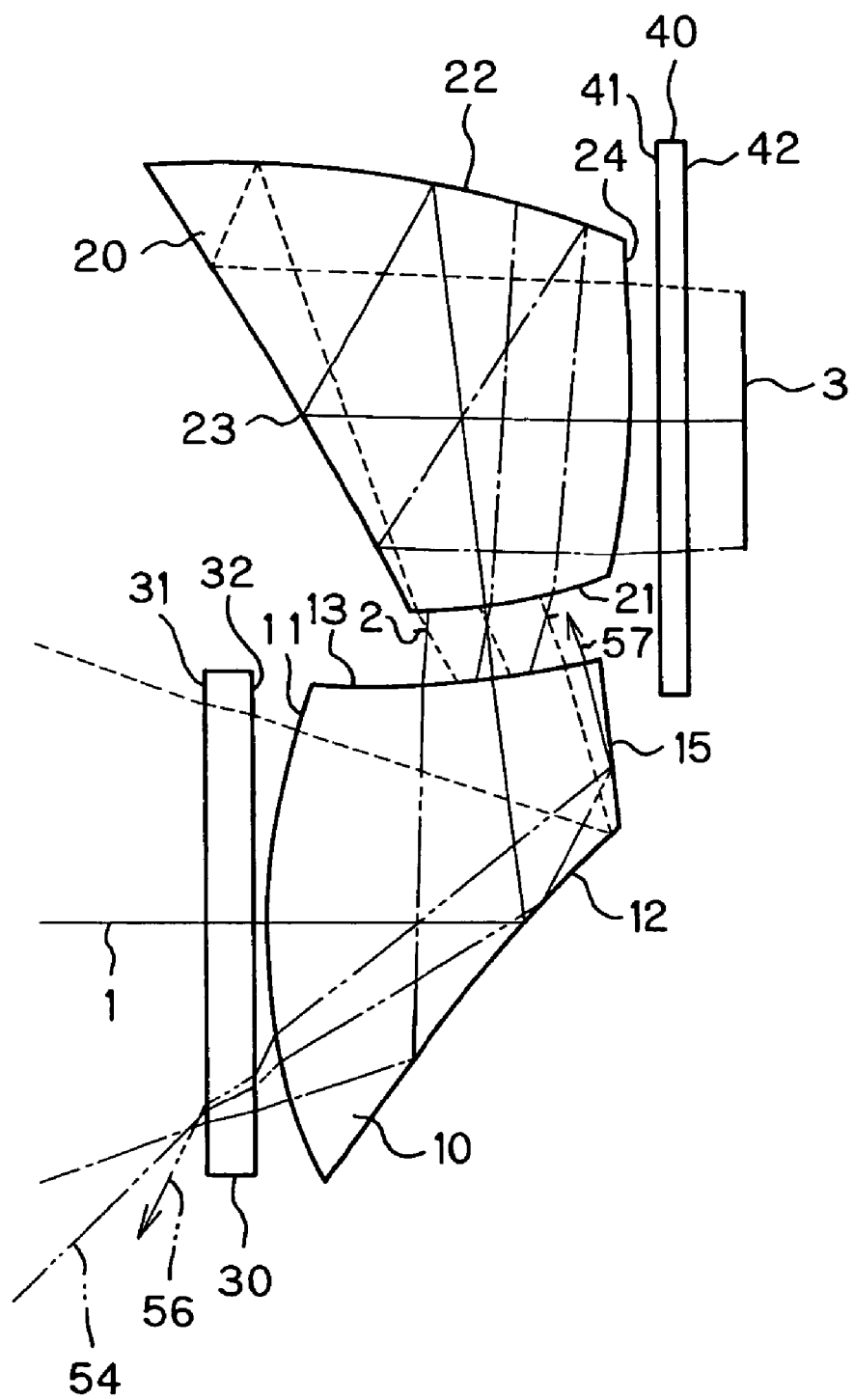
FIG. 5 is similar to FIG. 1, showing another ghost light-preventive means applied onto the non-optical surface of the first prism in Numerical Example 1.
Figure 6:
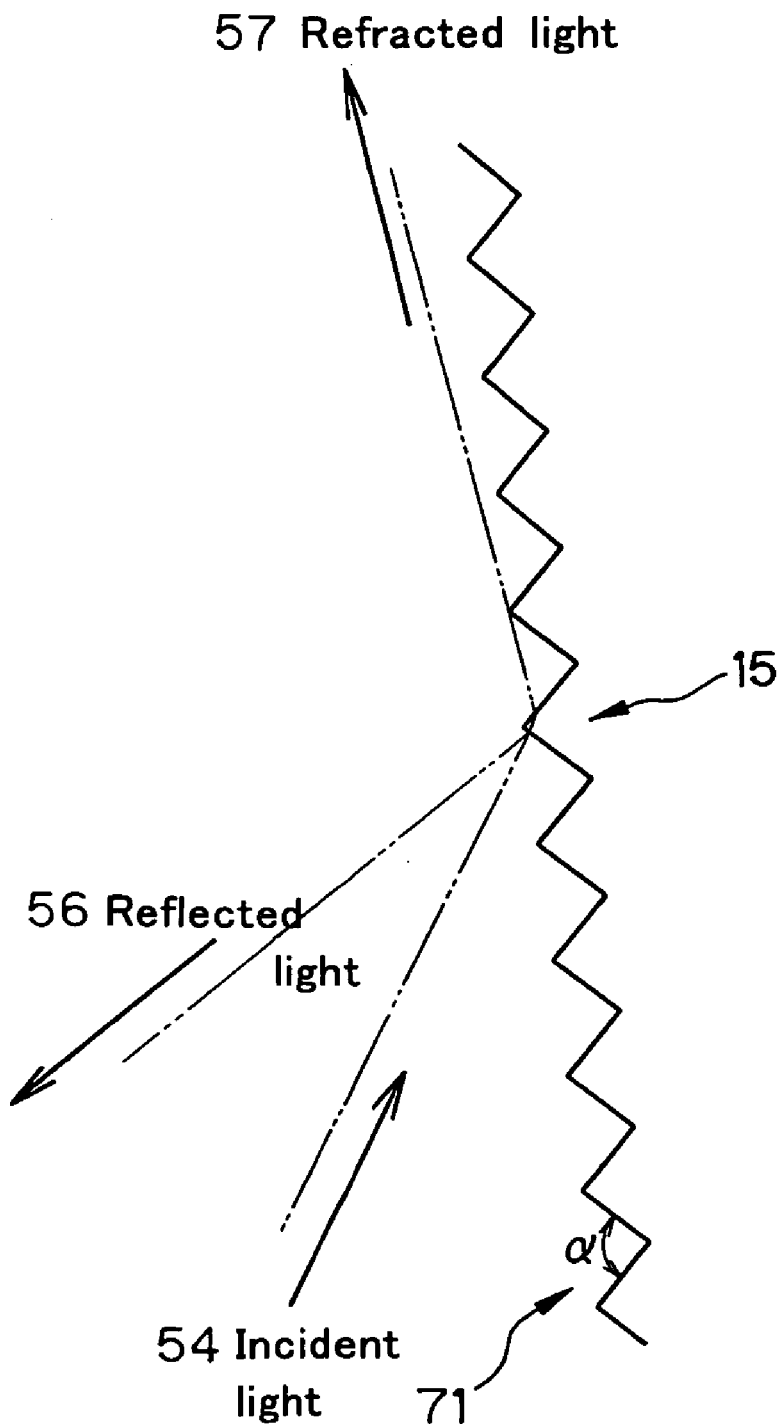
FIG. 6 is an enlarged sectional view of the non-optical surface in FIG. 5.

To avoid this, another ghost light-preventive means is applied onto the non-optical surface 15 in this example. FIG. 5 is an optical path diagram similar to FIG. 1, showing what happens when the ghost light-preventive means is applied, and FIG. 6 is an enlarged sectional view of that non-optical surface 15. As shown in FIG. 6, the non-optical surface 15 is provided with a number of grooves (shading lines) 71 at a fine pitch. The grooves 71 are formed linearly at a vertex angle α of about 90° in the horizontal direction (the vertical direction to the paper of FIG. 5) that is orthogonal to meridional section. Although the vertex angle α of each groove is preferably at or near 90°, it is understood that each groove functions effectively at vertex angles in the range of 60° to 120°, too.

The application of such shading lines 71 onto the non-optical surface 15 allows the light ray 54 to be incident on the non-optical surface 15 at a large angle of incidence and be reflected at the slant reflecting facet of the shading line 71, going back over in the form of reflected light 56, as can be seen from FIGS. 5 and 6. It is noted that the light ray 54 is a ray that deviates from the normal direction toward the entrance pupil and is reflected at the effective area of the second surface 12. Although not shown, there are some light rays popping out after reflection at the slant reflecting facets of the shading lines 71. There is also a refracted light 57 that reenters the prism 10 after two reflections at the slant facets between the shading lines 71. However, the refracted light 57 veers largely off the total reflection direction, striking on the stop 2 or other mechanical parts or deviating out of the effective diameter. Therefore, these light rays are less likely to become ghost light. Of light rays incident on the non-optical surface 15, a light ray having a small angle of incidence is reflected twice at the shading line 71, going back along substantially the same direction as the direction of incidence.

It is noted that the non-optical surface 15 having the shading lines 71 could be provided on its back side with shading means (e.g., by coating of a black paint). This ensures absorption of reflected light 56 and refracted light 57, resulting in more effective elimination of ghost light. The shading lines 71 used herein are formed at a groove interval (pitch) of 0.02 mm. It is noted that only the application of shading on the back side of the non-optical surface 15 without recourse to such shading lines 71, too, achieves some effects.

Figure 7:
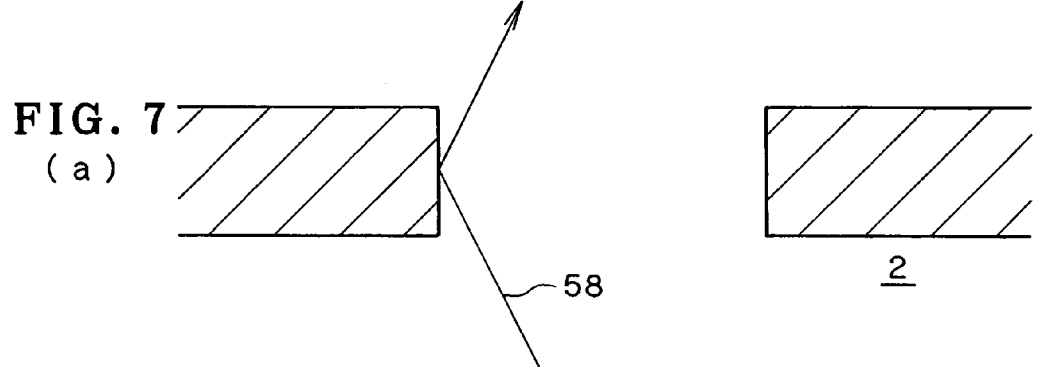
FIG. 7 is generally illustrative of one sectional shape of the stop located on the image side of the first prism. More specifically.
Figure 7:
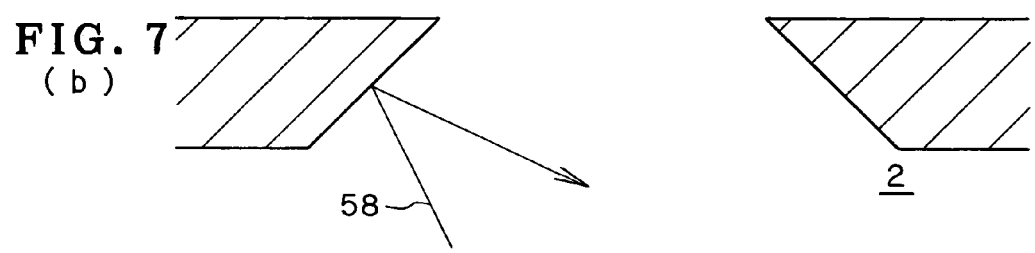
Figure 7:
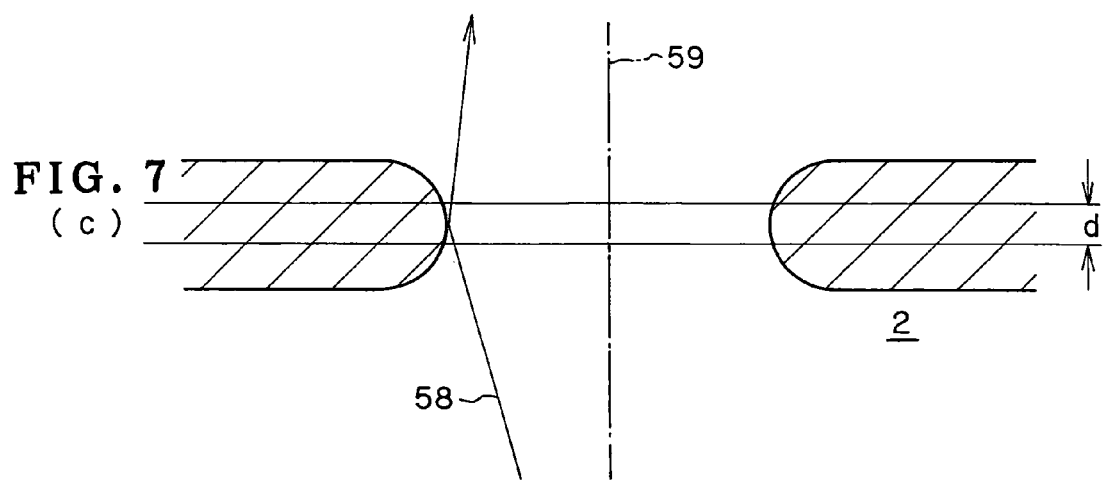

The sectional shape of the stop 2 is now explained. This stop 2 is located on the image side of the first prism 10. FIG. 7(a) is illustrative of the inner peripheral surface of an aperture in the stop 2, which is located substantially vertically to an end face that is opposite to the first prism 10 or the second prism 20. To put it another way, the inner peripheral surface of the aperture is configured into a shape substantially parallel with light rays passing through the aperture (axial light rays and axial chief rays). This causes a light ray 58 arriving at the aperture end face of the stop 2 to be reflected thereat toward the second prism 20 side only to yield ghost light. FIG. 7(b), on the other hand, is illustrative of the inner peripheral surface of the aperture in the stop 2, which is configured into a slant shape. To put it another way, the inner peripheral surface is configured into a conical shape with an aperture diameter increasing gradually toward the object side (the first prism side). In this case, the light ray 58 arriving at the aperture end face of the stop 2 is reflected thereat, going back over its way toward the first prism 10 side and, hence, yielding little or no ghost light.

In this connection, it is desired that the section of the aperture (leading) end of the stop 2 be configured into a pointed knife edge shape, as shown in FIG. 7(b). In actual applications, however, the section of the aperture end tends to have an arched shape, as shown in FIG. 7(c). When the section of the aperture end of the stop 2 is in an arched shape as described just above, at the aperture end there is a portion substantially parallel with the center axis 59 of the aperture. A light ray 58 arriving at that portion is reflected thereat, going toward the second prism 20 side only to yield ghost light. To prevent ghost light, such an arched portion should preferably have a thickness as much as reduced. It is here noted that the center axis 59 of the aperture is vertical to the end face of the stop 2.

With the aperture end arched in section, that section may be expressed in terms of a set of conical faces having various half-vertex angles. It is here preferable that d≦0.05 mm where d is the thickness of the portion that comprises conical faces wherein the half-vertex angle of each cone (an elliptic cone in the case of an elliptic aperture, and a pyramid in the case of a polygonal aperture) with its center axis defined by the aperture center axis 59 is up to 10°.

Figure 8A:
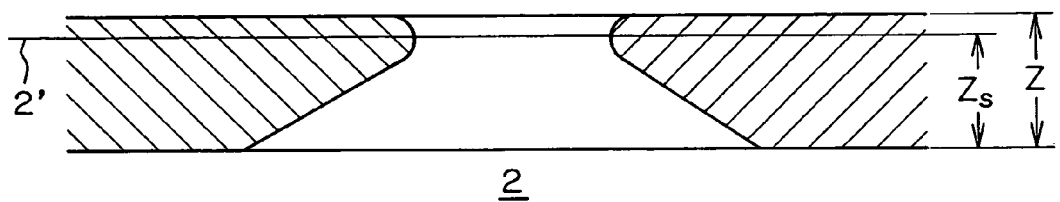
FIG. 8(a) shows that a knife edge-like end portion is rounded in an arched form.
Figure 8B:
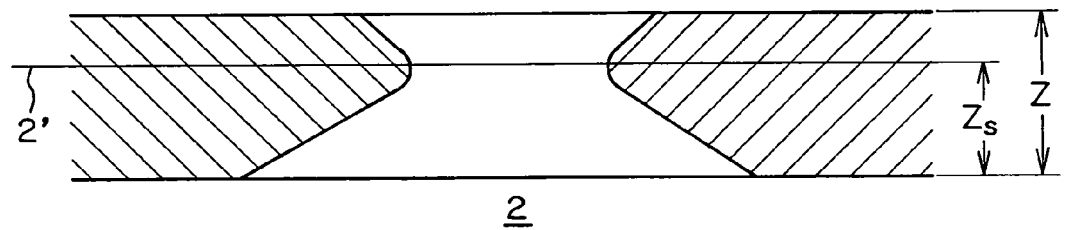
FIG. 8(b) shows that the knife edge-like end portion is inclined a bit open toward the image side as well.

FIGS. 8(a) and 8(b) are generally illustrative of a stop's aperture whose inner peripheral surface diameter increases gradually from one aperture end face to another (the inner peripheral surface is inclined wide open toward the object side). More specifically, FIG. 8(a) is illustrative of a knife edge-like aperture end that is rounded in arched shape, as shown in FIG. 7(b), and FIG. 8(b) is illustrative of a knife edge-like aperture end that is inclined not only as shown in FIG. 8(a), but slightly open toward the image side as well. In any case, the aperture is formed with the thickness d of up to 0.05 mm.

Referring to such a stop 2, light striking on the object side of stop 2 with respect to a stop plane 2' (a plane of connecting points of the smallest radius in the aperture end) goes back over its way. On the other hand, light striking on the image side of the stop 2 with respect to the stop plane 2' goes toward the image side, possibly yielding ghost light. Therefore, it is desired that more light strike on the aperture end face of the stop 2 on the object side with respect to the stop plane 2', except the portion having a slight thickness at or near the stop plane 2'.

Assume here that the Z-axis is defined by the thickness direction of a stop plate that forms the stop 2, the object-side surface is Z=0, the image-side surface is Z=1, and $Z_s$ is the position of the stop plane 2'. Then, $Z_s$ can be $0 < Z_s < 1$. To reduce ghost light, it is desired that $Z_s > 0.5$ in particular, and $Z_s > 0.8$ in more particular. The smaller the $Z_s$, the more increased the light rays reflected and scattered toward the image side are upon striking on the stop 2; that is, the quantity of light rays contributing to ghost increases and hence ghost becomes stronger.

Such an imaging optical system as described above may further include on the object side of the first prism 10 a hood for shading off all light but an effective light beam. This is helpful for reducing ghost light. Light within the effective angle of view is allowed to pass (by transmission or reflection) through the effective area of each of the optical surfaces that form the imaging optical system. In some cases, on the other hand, light having an angle of view larger than the effective angle of view is totally reflected at a surface adjacent to a certain optical surface. To avoid this, it is important to shade off light having an angle of view larger than the effective angle of view. For the purpose of shading off light having an angle of view larger than the effective angle of view, it is effective to provide a hood on the object side of the imaging optical system. However, care must be taken of the fact that the longer the hood the better, but this results in a bulky imaging optical system size.

Figure 9A:
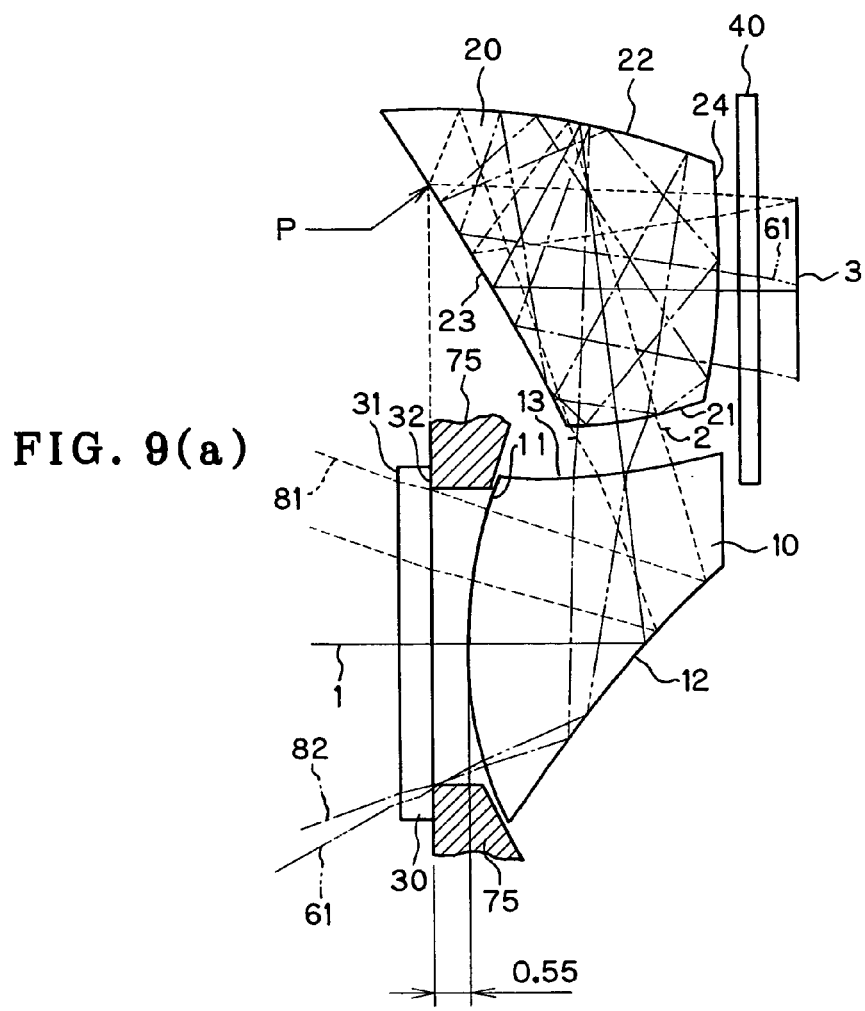
FIG. 9(a) is an optical path diagram similar to FIG. 1.
Figure 9B:
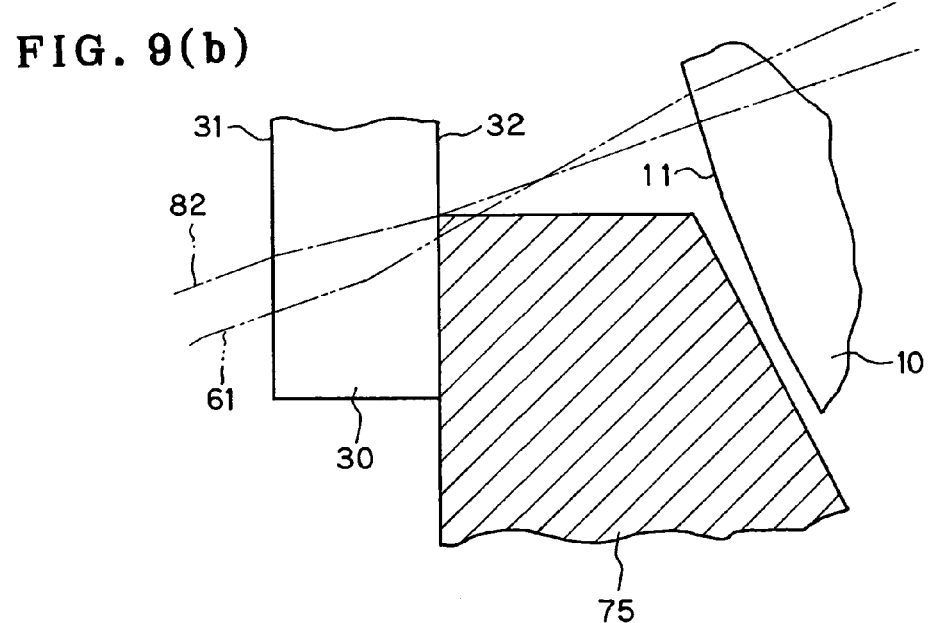
FIG. 9(b) is a partly enlarged view of FIG. 9(a).

FIG. 9 is generally illustrative of the hood located in place. More specifically, FIG. 9(*a*) is an optical path diagram similar to FIG. 1, and FIG. 9(*b*) is a partly enlarged view of FIG. 9(*a*). In FIG. 9, the hood is located in such a way as to keep the imaging optical system as it should be in size. In the instant example, the distance between the object-side cover glass 30 and the first surface 11 of the first prism 10 is increased from 0.14 mm to 0.55 mm. Otherwise, this example is the same as Numerical Example 1.

In FIG. 9, numeral reference 81 indicates the uppermost light ray (broken line) in the effective light beam, and 82 the lowermost light ray (one-dotted line). When there is no hood on the object side of the first prism 10, a light ray (two-dotted line) 61 that entails ghost passes through the first prism 10 while taking the normal optical path, and enters the second prism 20 from its first surface 21 via the stop 2. Then, the light ray 61 is reflected twice, first at the second surface 22 and then at the third surface 23, followed by total reflection first at the first surface 21 and then at the fourth surface 24. Subsequently, the light ray 61 is reflected a total of 8 times at the second surface 22, the third surface 23, the second surface 22, the fourth surface 24, the first surface 21, the third surface 23, the second surface 22 and the third surface 23. Finally, the light ray 61 arrives at the image pickup plane of the image pickup device 3 only to form a ghost image.

This light ray 61 is positioned a bit outside the object side of the first surface 11 of the first prism 10 and outside the effective light ray (the lowermost light ray 82 in FIG. 9). Therefore, if a hood 75 is formed in such a way as to cover this portion, it is then possible to shade off ghost light 61. In this example, the leding end position of the hood 75 (a distance from the image pickup plane of the image pickup device 3 as measured along the entrance-side optical axis) in a direction along the optical axis 1 is set in such a way as to align with a point P at which the effective light ray is nearest to the object side in the optical system. For this reason, the provision of this hood 75 is unlikely to increase in the axial size of the imaging optical system. In this example, the point P is given by a point of intersection of the third surface 23 of the second prism 20 with the lowermost light ray (indicated by a broken line) in the light beam, which determines the uppermost angle of view.

Alternatively, it is desirable to satisfy the relation $0.1D < L < D$ where is D is the effective diameter of the first surface 11 in the imaging optical system, and L is the length of the hood 75 (the distance from the leading end of the hood 75 to the vertex of the first surface 11 as measured along the entrance-side optical axis on the object side). As the length L of the hood 75 is shorter than $\frac{1}{10}$ of the effective diameter D of the first surface 11, it is impossible to cut off off-angle-of-view light that causes ghosts, and as the length L of the hood 75 is larger than the effective diameter D of the first surface 11, the whole length of the imaging optical system along the entrance-side optical axis becomes too large.

Figure 10:
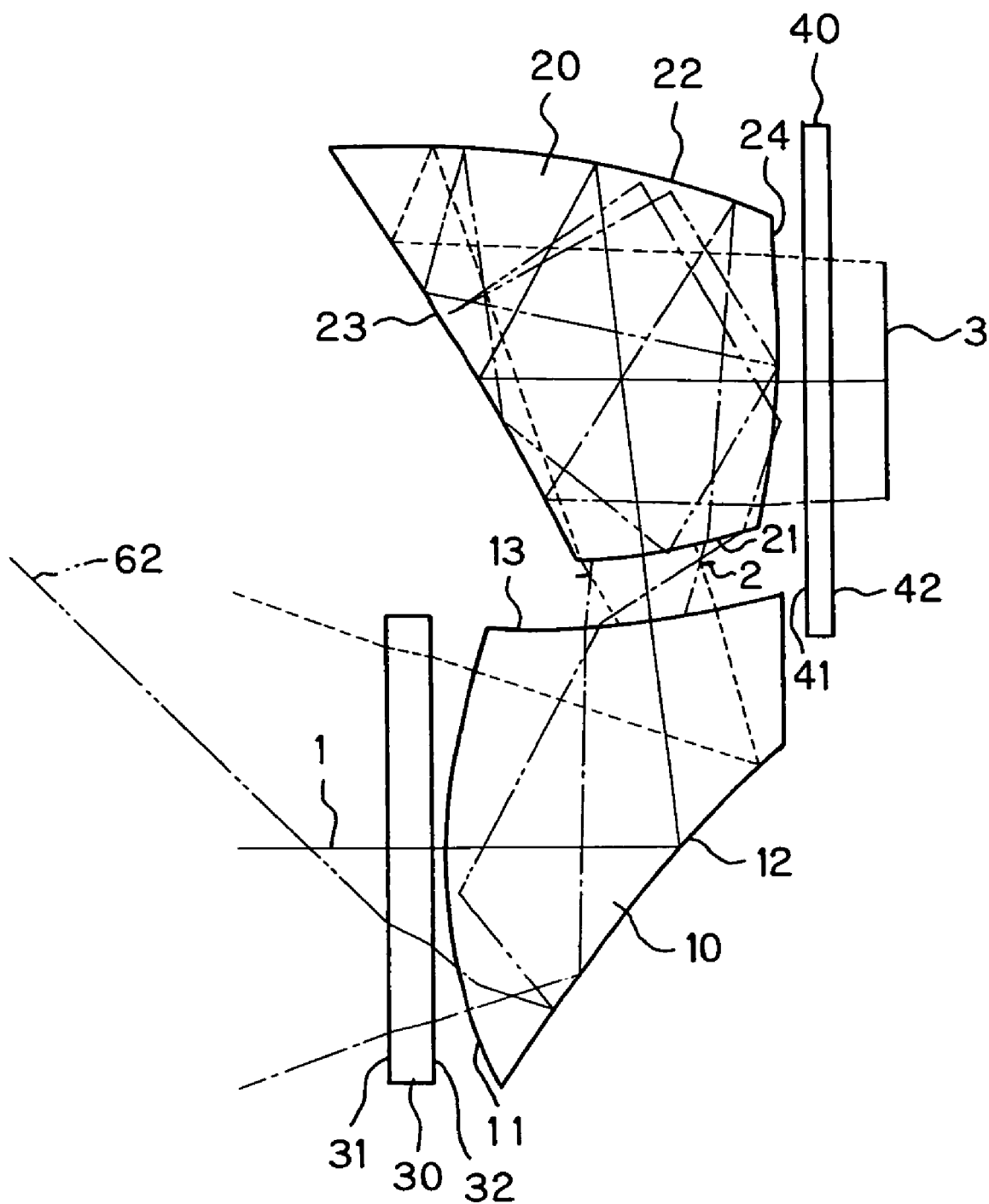
FIG. 10 is an optical path diagram similar to FIG. 1 for illustrating the inventive ghost light-preventive means applied onto the entrance surface of the second prism located on the image side of the stop.

The ghost light-preventive means to be provided onto the entrance (first) surface 21 of the second prism 20 is now explained. FIG. 10 is an optical path diagram similar to FIG. 1. Here, a light ray that veers off the normal direction toward the entrance pupil, for instance, is indicated at 62 (a two-dotted line) in FIG. 10. The light ray 62 passes through the cover glass 30, and enters the first prism 10 from its first surface 11. Upon incidence on the first prism 10, the light ray 62 is reflected at the second surface 12, and goes back to the first surface 11 at which it is totally reflected. The reflected light (light ray 62) leaves the first prism 10 from its third surface 13, entering the second prism 20 through the stop 2. In this case, the light ray 62 is incident on a non-effective area of the first surface 21 of the second prism 20, and then reflected nine times at the fourth surface 24, the second surface 22, the third surface 23, the second surface 22, the fourth surface 24, the first surface 21, the third surface 23, the second surface 22 and the third surface 23 in this order. Finally, the reflected light (light ray 62) arrives at the image pickup plane of the image pickup device 3 only to form a ghost image.

Figure 11:
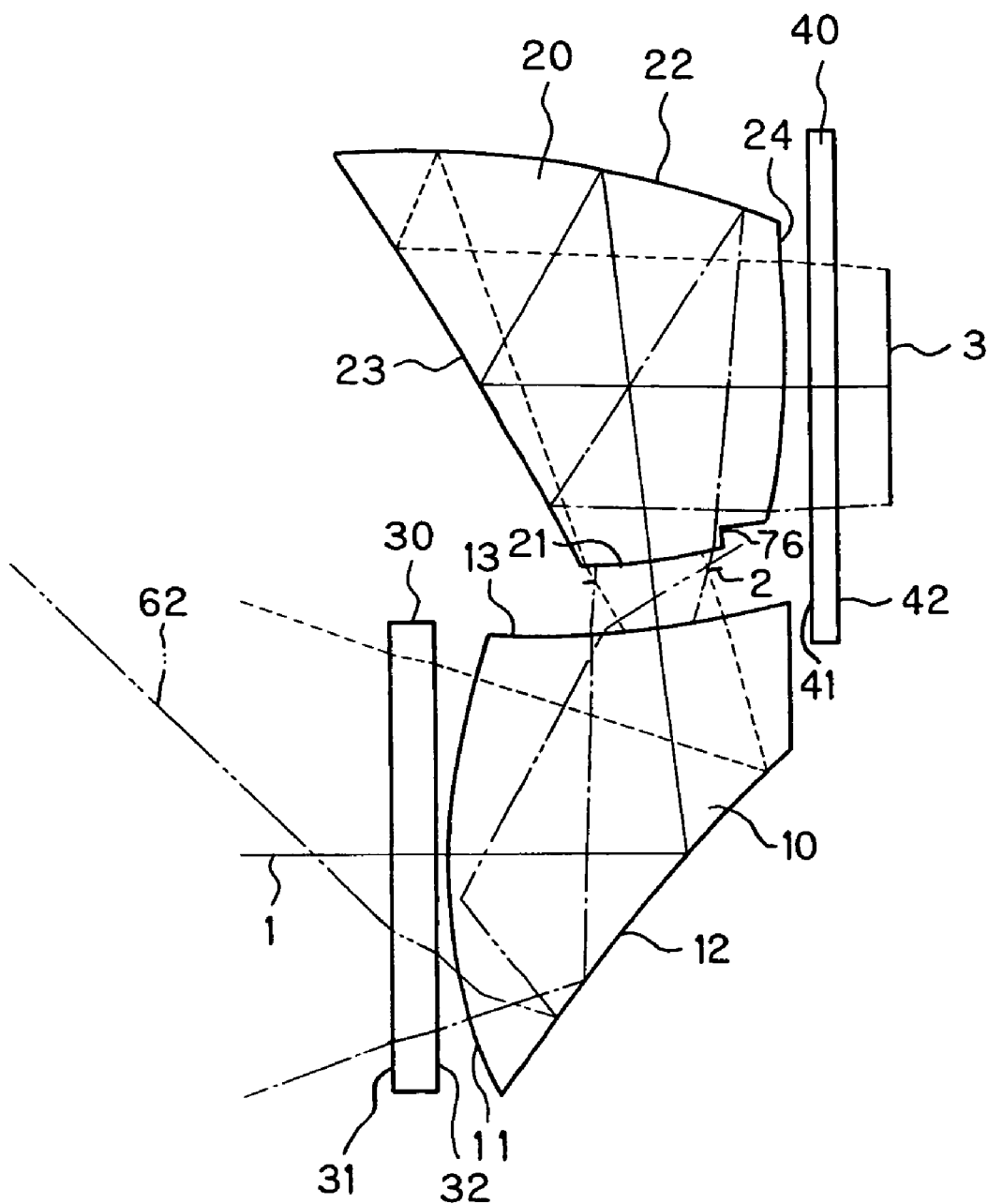
FIG. 11 is an optical path diagram similar to FIG. 10 in the case where a step is provided on a non-effective area of the first surface of the first prism in such a way as to pop up the effective area thereof.

To prevent ghost light, a step is provided at a given position on the optical surface. FIG. 11 is an optical path diagram, and FIG. 13(*a*) is a partly enlarged view of FIG. 11. In FIG. 11, a step 76 is provided at a non-effective area of the first surface of the second prism 20 to allow the effective area of the first surface 21 to stand out, thereby preventing a ghost-generating light ray 62 from crossing the first surface 21. As a result, the light ray 62 does not enter the second prism 20, leading to no ghost light.

Although, in FIG. 11, the cutout is formed in the non-effective surface or area, it is acceptable to form a new slant or planar portion. It is then preferable to apply shading to the cutout portion (e.g., slant) or the new slant or planar portion as by coating of a light absorbing paint or the like. More preferably, this portion should be subjected to shading or gradation, because regular reflection or refraction at its surface can be avoided. Also, if other shading part (such as a stop member) is located on the periphery of the cutout, it is then possible to prevent propagation of light ray 62. It is noted that the surface of a portion of the cutout step 76 (step portion) should preferably be formed by a slant with a gradient rather than a vertical plane to the peripheral plane.

Figure 12:
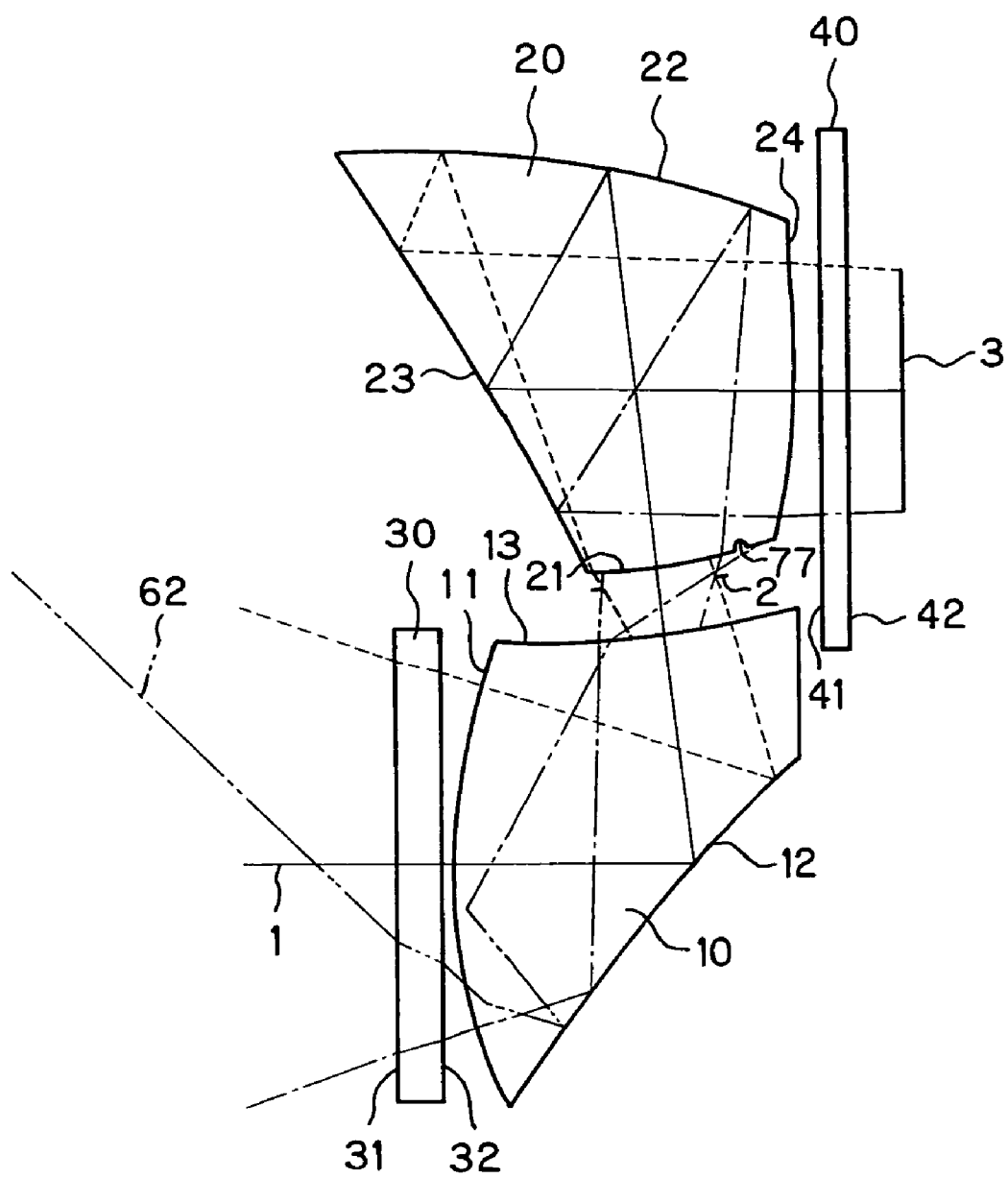
FIG. 12 is an optical path diagram similar to FIG. 10 in the case wherein a V-groove is provided in a non-effective area of the first surface of the second prism.
Figure 13A:
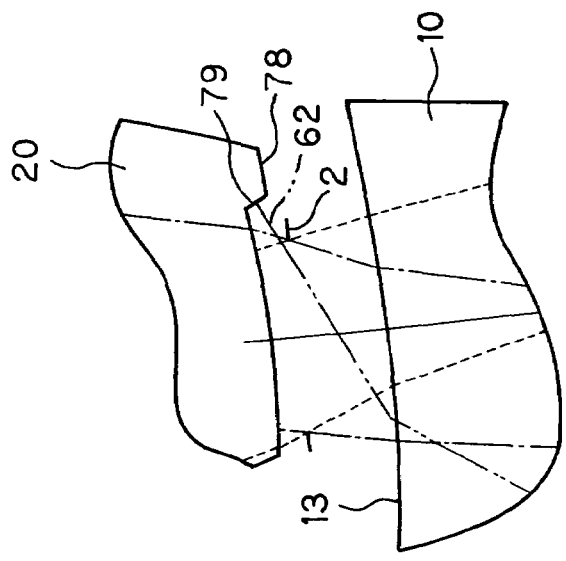
FIG. 13(a) is an enlarged view of parts of FIG. 11.
Figure 13B:
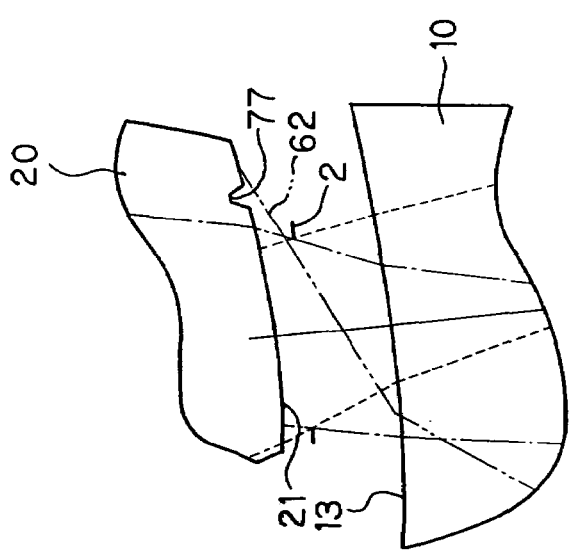
FIG. 13(b) is an enlarged view of parts of FIG. 12.

Instead of such a step 76, it is acceptable to provide a V-groove 77 in the non-effective area of the first surface 21 of the second prism 20, as shown typically in the optical path diagram of FIG. 12, and in FIG. 13(*b*) that is a partly enlarged view of FIG. 12. In this case, although a portion of the optical surface remains outside the effective surface portion, it is delimited by the V-groove 77 from the effective area. Therefore, the remaining optical surface portion may be subjected to shading as by coating of a light-absorbing paint or, alternatively, gradation or the like, thereby avoiding regular reflection or refraction at its surface. As a result, a ghost-inducing light ray 62 is kept from entering the second prism 20, thereby preventing the occurrence of ghosts.

Figure 13C:
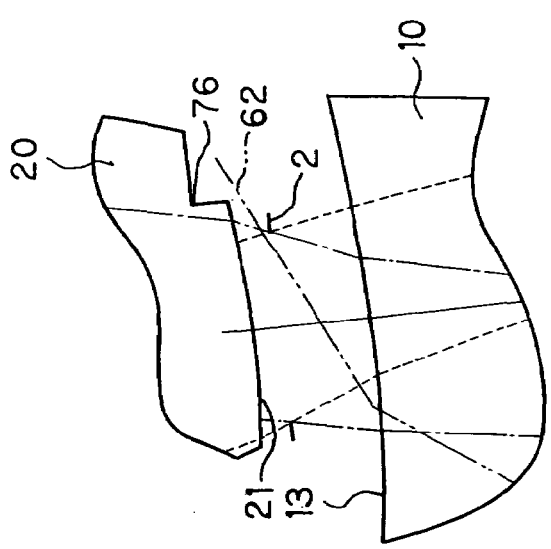
FIG. 13(c) is an enlarged view of parts in the case where only the effective area of the first surface of the second prism is dented down from its peripheral planar portion.

Instead of providing the step 76 or the V-groove 77, it is also acceptable to configure only the effective portion into a concave shape, as shown typically in FIG. 13(*c*) that is a partly enlarged view. In FIG. 13(c), the only the effective area of the first surface 21 of the second prism 20 is dented with respect to its peripheral planar portion 78 that acts as a step. A connecting slant 79 extending from the planar potion 78 to the effective area of the first surface 21 may be subjected to shading as by coating of a light-absorbing paint. More preferably, the planar portion 78 should be subjected to shading.

In the imaging optical system such as one illustrated in FIG. 1, at least one decentered prism is located on each of the object and image sides of the stop 2. Each decentered prism 10, 20 includes an inner reflecting surface comprising a free-form surface. There is total reflection at the reflecting surface 12, 22, 23 of the decentered prism 10, 20. However, there is no total reflection at a certain area of the reflecting surface 12, 22, 23. Such an area (at which no total reflection occurs) is provided with the aforesaid reflection-enhancing member such as a reflection film comprising a dielectric multilayer film, a reflection film comprising a metal film or the like.

Figure 14A:
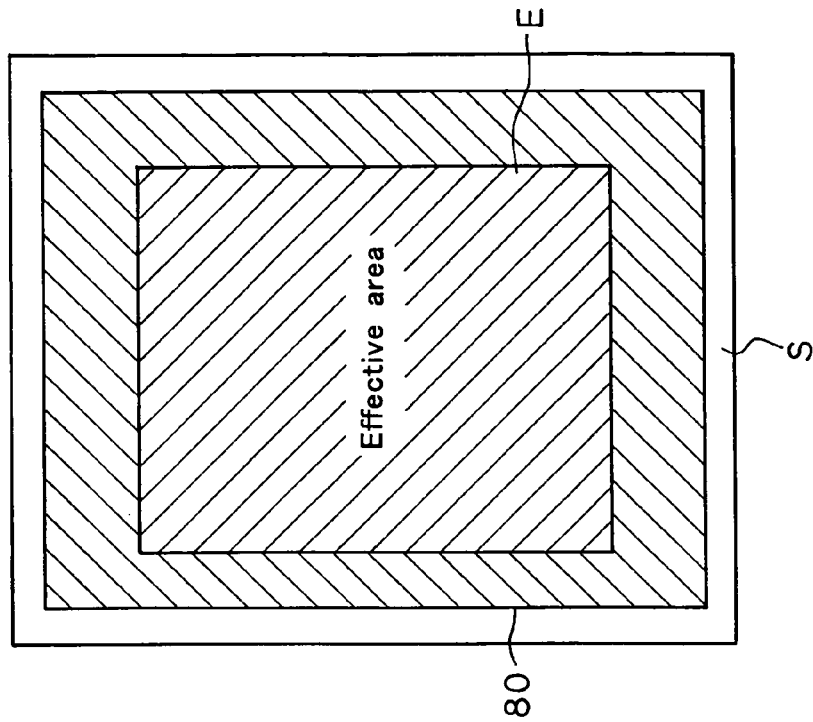
FIG. 14(a) is illustrative of one embodiment of the invention.
Figure 14B:
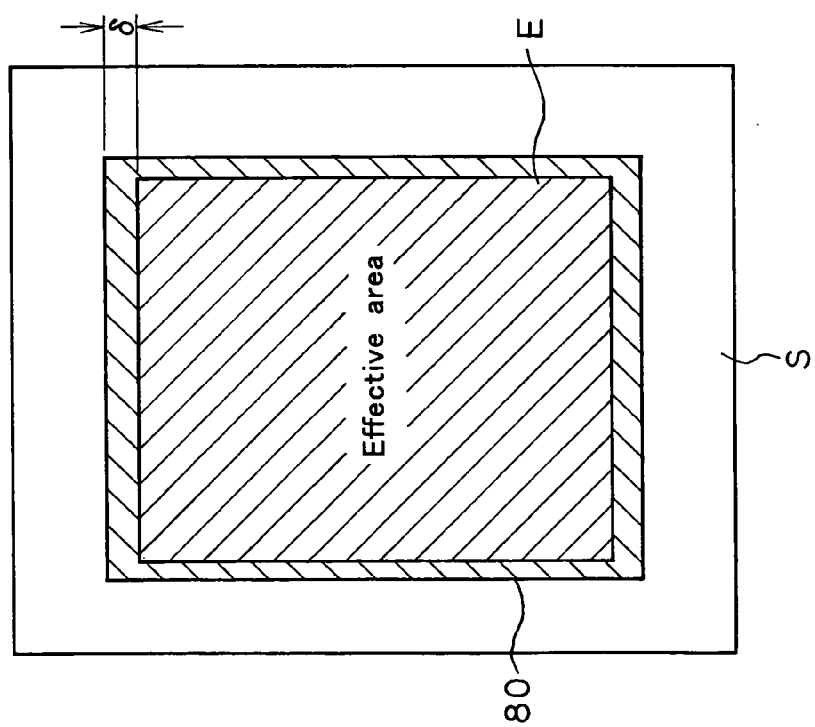
FIG. 14(b) is illustrative of one wider reflection-enhancing member.

In FIG. 14, the inner reflecting surface is generally shown at S. As shown in FIG. 14(b), as a wide reflection-enhancing member 30 is applied around an effective area E of the inner reflecting surface S, ghost light is likely to occur. That is, in the reflecting surface S of the decentered prism 10, 20 there are an optically necessary portion (effective area E) and a mechanically necessary portion (connecting portion for an adjacent surface or the like). The application of the reflection-enhancing member 80 to the mechanically necessary portion causes ghost light. Therefore, it is desired that the reflection-enhancing member 80 be applied over a range of the effective area E plus its peripheral slight margin, as shown in FIG. 14 (a). The margin width δ should desirously range from 0.05 mm to 0.1 mm. As the margin width δ is smaller than 0.05 mm, reflection of normal light will not often occur due to fabrication errors, and a margin width δ of greater than 0.1 mm is not preferred because there will be a high probability of ghost light occurring.

In accordance with the present invention, ghost light can be much more reduced by combined use of two or more ghost light-preventive means.

I claim:

1. An imaging optical system, comprising an aperture stop, and a decentered prism located on an object side of said aperture stop and having a rotationally asymmetric reflecting surface, wherein:
said decentered prism comprises three surfaces including an entrance surface, a reflecting surface and an exit surface, wherein a reflection-enhancing member is applied onto an area in an effective area of said reflecting surface except an area thereof at which are effective light beam is totally reflected.

2. An imaging optical system, comprising an aperture stop, and a decentered prism located on an object side of said aperture stop and having a rotationally asymmetric reflecting surface, wherein:
said decentered prism comprises three surfaces consisting of an entrance surface, a reflecting surface and an exit surface with the number of said reflecting surface being only one, wherein said reflecting surface includes a reflection-enhancing member, and a light ray that is incident from said exit surface and goes through said decentered prism toward said entrance surface in a direction opposite to a direction of a light ray from an object is kept from reaching an area of said reflecting surface onto which said reflection-enhancing member is applied, after total reflection at said entrance surface.

3. The imaging optical system according to claim 2, wherein a light ray that passes through an aperture in said aperture stop, striking on said exit surface, is kept from reaching the area of said reflecting surface onto which said reflection-enhancing member is applied, after total reflection at said entrance surface.

4. An imaging optical system, comprising an aperture stop, and a decentered prism located on an object side of said aperture stop and having a rotationally asymmetric reflecting surface, wherein:
said prism includes an entrance surface, a reflecting surface and an exit surface, and said prism is plane symmetric with respect to a plane including an optical axis thereof and is provided with a non-optical surface that faces said entrance surface and takes no part in image information, wherein said non-optical surface comprises shading lines comprising a plurality of grooves in a direction that crosses the plane including the optical axis of said prism.

5. The imaging optical system according to claim 4, wherein a back side of said non-optical surface provided with said shading lines has also been subjected to shading.

6. An imaging optical system, comprising an aperture stop, and a decentered prism located on an object side of said aperture stop and having a rotationally asymmetric reflecting surface, wherein:
an end face of an aperture in said aperture stop includes a portion comprising conical facets in which a half-vertex angle of each cone with an aperture center axis as a center axis is up to 10°, wherein said portion has a thickness of up to 0.05mm.

7. An imaging optical system, comprising an aperture stop, and a decentered prism located on an object side of said aperture stop and having a rotationally asymmetric reflecting surface, wherein:
said aperture stop is formed of a stop plate, and a position $Z_s$ of a stop plane satisfies $Z_s>0.5$, where said plane is defined by a section at which an aperture area in a direction vertical to an optical axis of said stop plate becomes smallest, an object-side surface of stop plate that forms said aperture stop is $Z=0$, and an image-side surface of said stop plate is $Z=1$, and
said aperture stop, in a section including said optical axis, is configured with a tilt from said object-side surface toward said stop plane.

8. An imaging optical system, comprising an aperture stop, and a decentered prism located on an object side of said aperture stop and haring a rotationally asymmetric reflecting surface, wherein:
said prism includes an entrance surface, a reflecting surface and an exit surface, and on an object side of the entrance surface of said prism there is provided a hood for shading off light from outside an effective light beam, wherein an end of said head as measured parallel with an entrance-side optical axis located substantially at the same position as a paint where the effective light beam is positioned nearest to the object side in said imaging optical system.

9. An imaging optical system, comprising an aperture stop, and a decentered prism located on an object side of said aperture stop and having a rotationally asymmetric reflecting surface, wherein:
an entrance surface of a decentered prism located on an image side of said aperture stop includes a groove provided outside an effective area thereof.

10. The imaging optical system, comprising an aperture stop, and a decentered prism located on an object side of said aperture stop and having a rotationally asymmetric reflecting surface, wherein:

an entrance surface of a decentered prism located on an image side of said aperture stop includes a step or a groove provided outside an effective area thereof and a shading portion applied outside said step or said groove.

11. An imaging optical system, comprising an aperture stop, and a decentered prism located on an object side of said aperture stop and having a rotationally asymmetric reflecting surface, wherein:

a reflecting surface of a decentered prism at least located on an image side includes a reflection-enhancing member applied over a range of an effective margin of 0.05 mm to 0.1 mm provided on a periphery thereof.

12. The imaging optical system according to claim 1, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

13. The imaging optical system according to claim 2, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

14. The imaging optical system according to claim 4, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

15. The imaging optical system according to claim 6, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

16. The imaging optical system according to claim 7, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

17. The imaging optical system according to claim 8, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

18. The imaging optical system according to claim 9, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

19. The imaging optical system according to claim 11, wherein on an object side of the aperture stop there is provided a decentered prism comprising three surfaces consisting of an entrance surface, a reflecting surface and an exit surface and on an image side of the aperture stop there is provided a decentered prism comprising four surfaces consisting of an entrance surface, two reflecting surfaces and an exit surface, and wherein the whole imaging optical system is plane symmetric with respect to a meridional section.

20. An imaging optical system, comprising an aperture stop, and a decentered prism located on an object side of said aperture stop and having a rotationally asymmetric reflecting surface, wherein:

an entrance surface of a decentered prism located on an image side of said aperture stop includes a step or a groove provided outside an effective area thereof, wherein said step or groove is formed in a direction along the X-axis where the Z-axis is defined by an axial chief ray on the object side of a first surface of a cover glass, the Y-axis is defined in a direction that is orthogonal to the Z-axis and lies in a meriodinal section and the X-axis is defined by a direction that is orthogonal to the Z-axis and Y-axis.

* * * * *

UNITED STATES PATENT AND TRADEMARK OFFICE
CERTIFICATE OF CORRECTION

PATENT NO.          : 7,110,191 B2                                              Page 1 of 1
APPLICATION NO. : 11/072344
DATED                  : September 19, 2006
INVENTOR(S)         : Tohru Nakamura It is certified that error appears in the above-identified patent and that said Letters Patent is hereby corrected as shown below:

Column 6, line 51, change "$x = R \times \cos(A) y = R \times \sin(A) z =$" to --$x = R \times \cos(A)$--;

Column 6, immediately below line 51, insert the following two separate lines of equations:

--$y = R \times \sin(A)$-- and

--$z =$--.

Signed and Sealed this

Twenty-seventh Day of February, 2007

JON W. DUDAS
*Director of the United States Patent and Trademark Office*